(12) United States Patent
Zimmermann et al.

(10) Patent No.: US 11,366,078 B2
(45) Date of Patent: Jun. 21, 2022

(54) ION MOBILITY SPECTROMETER AND METHOD FOR ANALYZING SAMPLES BY ION MOBILITY SPECTROMETRY

(71) Applicant: GOTTFRIED WILHELM LEIBNIZ UNIVERSITÄT HANNOVER, Hannover (DE)

(72) Inventors: Stefan Zimmermann, Burgwedel (DE); Ansgar Kirk, Hannover (DE); André Ahrens, Hannover (DE); Moritz Hitzemann, Wedemark (DE); Martin Lippmann, Hannover (DE)

(73) Assignee: GOTTFRIED WILHELM LEIBNIZ UNIVERSITAET HANNOVER, Hannover (DE)

( * ) Notice: Subject to any disclaimer, the term of this patent is extended or adjusted under 35 U.S.C. 154(b) by 0 days.

(21) Appl. No.: 17/044,981

(22) PCT Filed: Apr. 3, 2019

(86) PCT No.: PCT/EP2019/058399
§ 371 (c)(1),
(2) Date: Oct. 2, 2020

(87) PCT Pub. No.: WO2019/193047
PCT Pub. Date: Oct. 10, 2019

(65) Prior Publication Data
US 2021/0164939 A1    Jun. 3, 2021

(30) Foreign Application Priority Data

Apr. 4, 2018   (DE) .................... 10 2018 107 910.9

(51) Int. Cl.
*H01J 49/00* (2006.01)
*G01N 27/622* (2021.01)

(52) U.S. Cl.
CPC ................................. *G01N 27/622* (2013.01)

(58) Field of Classification Search
CPC .. H01J 49/00; H01J 49/02; H01J 49/06; H01J 49/061; H01J 49/062; H01J 49/063; H01J 49/065; H01J 49/066; G01N 27/622
(Continued)

(56) References Cited

U.S. PATENT DOCUMENTS

| 4,445,038 A | 4/1984 | Spangler et al. |
| 5,200,614 A | 4/1993 | Jenkins |

(Continued)

FOREIGN PATENT DOCUMENTS

| DE | 102009019691 A1 | 12/2009 |
| DE | 112010000010 T5 | 11/2011 |

(Continued)

OTHER PUBLICATIONS

Chen et al: "Field Switching Combined with Bradbury-Nielsen Gate for Ion Mobility Spectrometry", Analytical Chemistry, vol. 87, pp. 7925-7930.

Eiceman et al: "Field Switching Inside Source Region", Ion Mobility Spectrometry, Third Edition, p. 106, 2014.

Zuhlke et al: "An alternative field switching ion gate for ESI-ion mobility spectrometry", Int. J. Ion Mobil. Spec. vol. 20, pp. 67-73, 2017.

*Primary Examiner* — Jason L McCormack
(74) *Attorney, Agent, or Firm* — WCF IP

(57) ABSTRACT

The invention relates to an ion mobility spectrometer which has at least a first drift chamber and a first switchable ion gate for the controlled transfer of ions into the first drift chamber, wherein: —the first ion gate is designed as a field switching ion gate having at least a first counter electrode and a first injection electrode; wherein—a first ionization chamber is formed between the first counter electrode and the first injection electrode, into which first ionization chamber ions to be analyzed by ion mobility spectrometry can be fed from an ionization source. The invention also relates to an ion mobility spectrometer which has at least a first drift (Continued)

Figure 1:
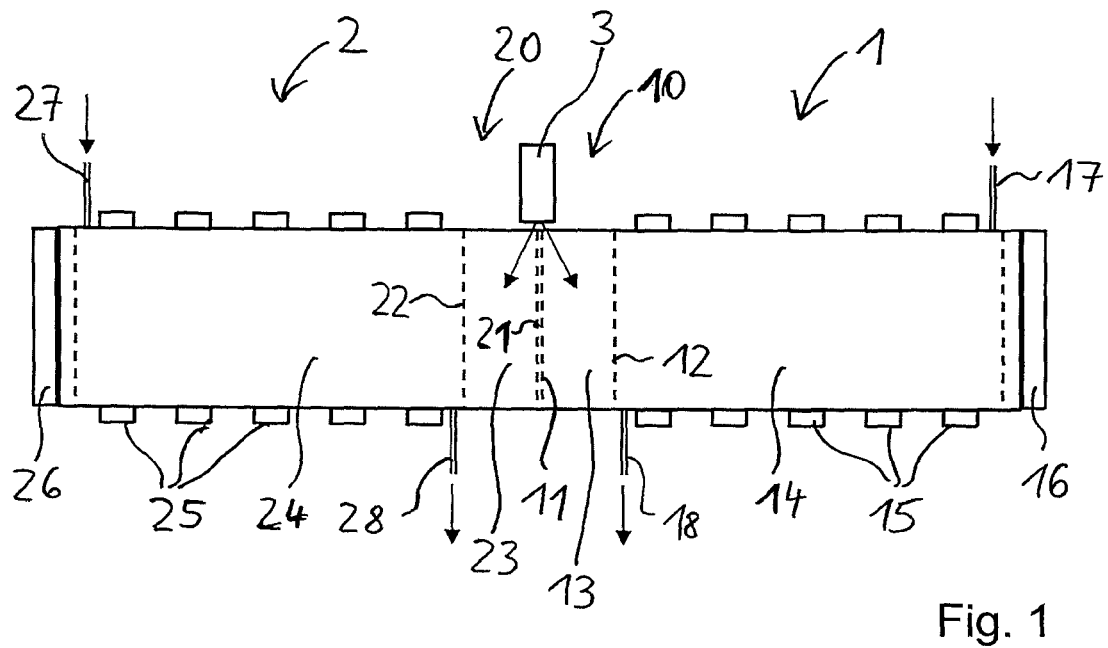

chamber and a first switchable ion gate for the controlled transfer of ions into the first drift chamber and a second drift chamber separated from the first drift chamber and a second switchable ion gate for the controlled transfer of ions into the second drift chamber. The invention also relates to a method for analyzing samples by ion mobility spectrometry by means of an ion mobility spectrometer, e.g. an ion mobility spectrometer of the aforementioned type, wherein by means of an ionization source ions to be analyzed are produced from the sample and are provided in an ionization chamber of the ion mobility spectrometer.

13 Claims, 10 Drawing Sheets

(58) Field of Classification Search
USPC .......................................... 250/281, 282, 288
See application file for complete search history.

(56) References Cited

U.S. PATENT DOCUMENTS

| 6,627,878 | B1* | 9/2003 | Machlinski | G01N 1/2202 |
| | | | | 250/286 |
| 2008/0179515 | A1 | 7/2008 | Sperline | |
| 2011/0133072 | A1* | 6/2011 | Li | G01N 27/622 |
| | | | | 250/281 |

FOREIGN PATENT DOCUMENTS

| DE | 11 2009 001 895 B4 | 7/2013 |
| DE | 102015112869 A1 | 2/2017 |
| EP | 2428797 A1 | 3/2012 |
| GB | 2464605 A | 4/2010 |

* cited by examiner

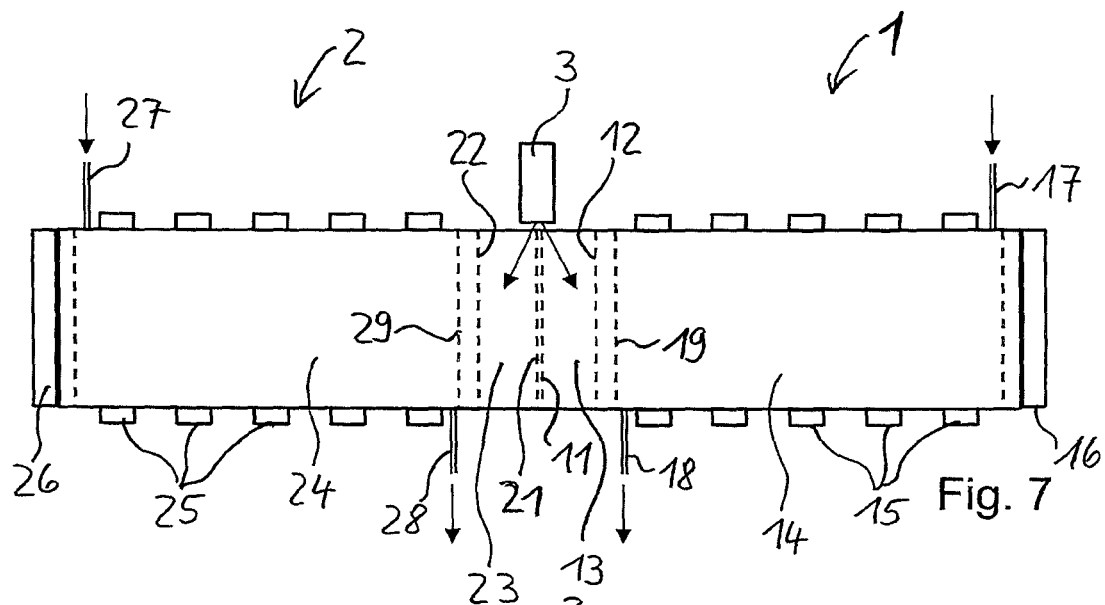
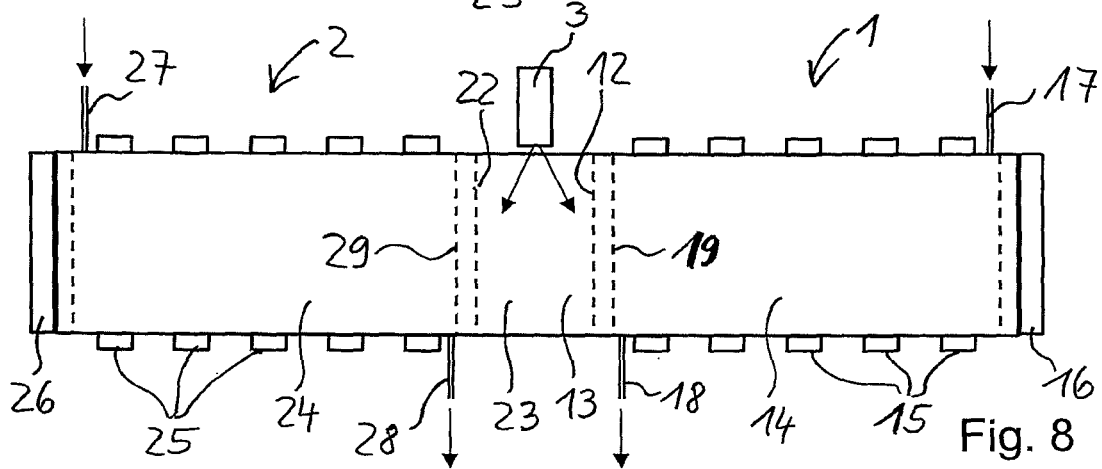
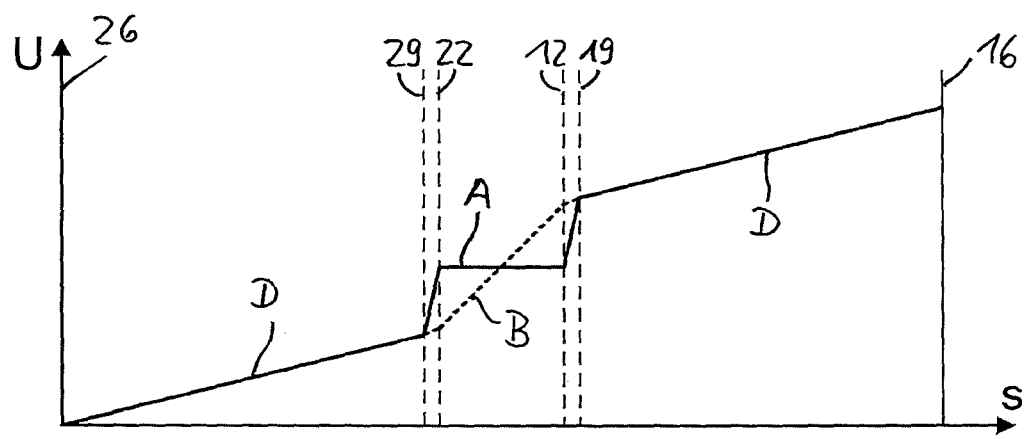

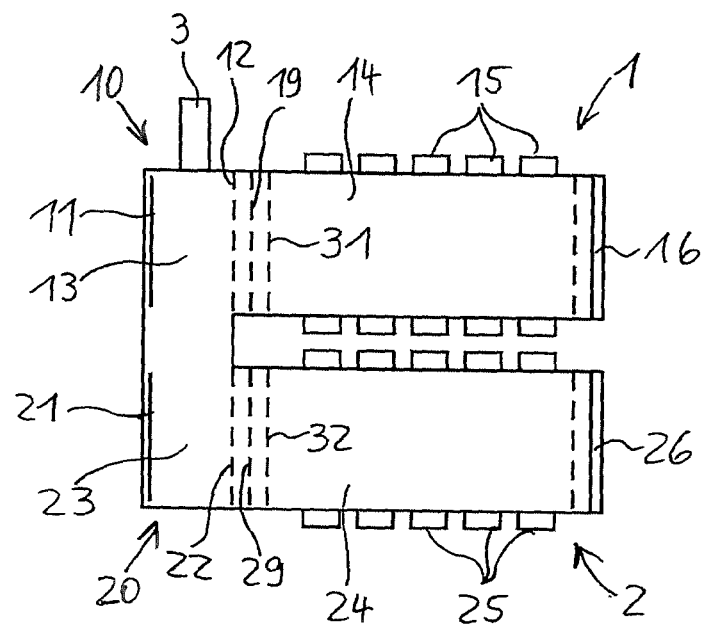
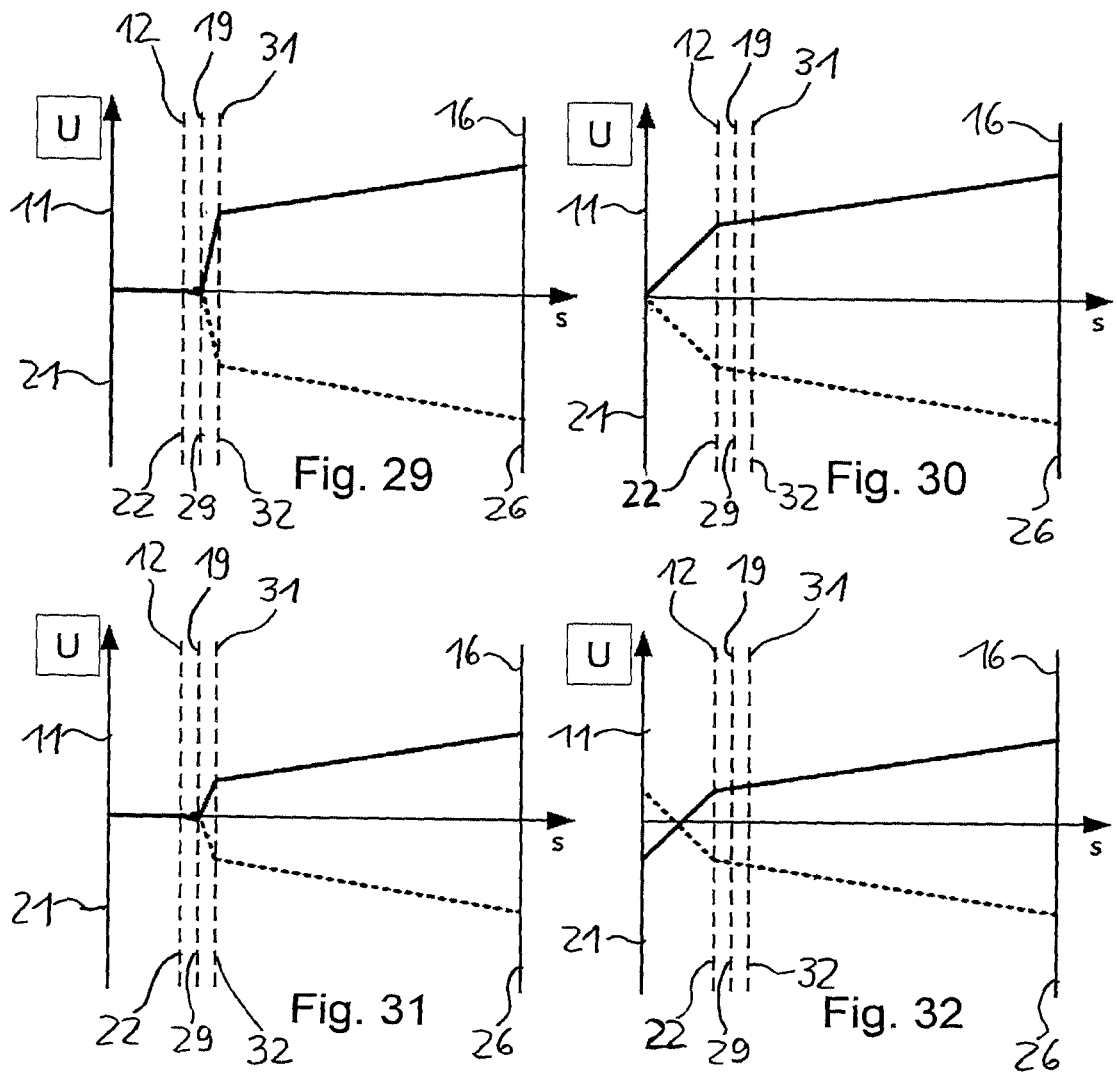
Fig. 28
Fig. 29
Fig. 30
Fig. 31
Fig. 32

ION MOBILITY SPECTROMETER AND METHOD FOR ANALYZING SAMPLES BY ION MOBILITY SPECTROMETRY

The invention generally relates to the field of ion mobility spectrometers and methods for analyzing samples by ion mobility spectrometry. In this case, the abbreviation IMS is used both for the measuring method "ion mobility spectrometry" and for the measuring device "ion mobility spectrometer".

The invention relates to an ion mobility spectrometer comprising at least a first drift chamber and a first switchable ion gate for the controlled transfer of ions into the first drift chamber, wherein the first ion gate is embodied as a field switching ion gate comprising at least a first counter electrode and a first injection electrode, wherein a first ionization chamber is formed between the first counter electrode and the first injection electrode, into which ionization chamber ions to be analyzed by ion mobility spectrometry are able to be fed from an ionization source.

The invention additionally relates to an ion mobility spectrometer comprising at least a first drift chamber and a first switchable ion gate for the controlled transfer of ions into the first drift chamber, and also a second drift chamber separated from the first drift chamber and a second switchable ion gate for the controlled transfer of ions into the second drift chamber.

The invention additionally relates to a method for analyzing samples by ion mobility spectrometry by means of an ion mobility spectrometer, e.g. an ion mobility spectrometer of the type mentioned above, wherein by means of an ionization source ions to be analyzed are generated from the sample and are provided in an ionization chamber of the ion mobility spectrometer.

Devices and methods for ion mobility spectrometry are known for example from DE 10 2015 112 869 A1 or EP 2 428 797 A1.

The invention is based on the object of improving such ion mobility spectrometers and methods for ion mobility spectrometry with regard to practical suitability for use. This object is achieved by means of an ion mobility spectrometer comprising at least a first drift chamber and a first switchable ion gate for the controlled transfer of ions into the first drift chamber, wherein the first ion gate is embodied as a field switching ion gate comprising at least a first counter electrode and a first injection electrode, wherein a first ionization chamber is formed between the first counter electrode and the first injection electrode, into which ionization chamber ions to be analyzed by ion mobility spectrometry are able to be fed from an ionization source, wherein at least one first additional electrode is arranged between the first ion gate and the first drift chamber, ions to be transferred into the first drift chamber by means of the first ion gate additionally being able to be influenced by said first additional electrode. By virtue of the first additional electrode additionally present, which is otherwise absent in ion mobility spectrometers having a field switching ion gate, it is possible to realize a plurality of extended functionalities of the ion mobility spectrometer which enable the resolution capability and the sensitivity of the ion mobility spectrometer to be increased. The first additional electrode makes it possible to realize for example the double field switching method, also explained below, the extended field switching method and a combination thereof, which is referred to as an extended double field switching method, by generating corresponding potential gradients between the electrodes. The outlay for realizing such an ion mobility spectrometer is comparatively low, particularly since a field switching ion gate can be used. As a result, the ion mobility spectrometer can be realized particularly compactly in its construction and cost-effectively.

A field switching ion gate comprises a counter electrode and an injection electrode. When a field switching ion gate is used, the ionization, that is to say the provision of ions from a sample, is effected in a field-free or almost field-free space, which is also referred to as an ionization chamber. The ionization chamber is situated between the counter electrode and the injection electrode, wherein the drift chamber of the ion mobility spectrometer is arranged behind the injection electrode, as viewed from the ionization chamber. By means of corresponding potential switching of the electrodes of the field switching ion gate, ions provided in the ionization chamber as an ion packet can be transferred into the drift chamber, where they are guided by an electric field generated there along the ionization chamber as far as an ion detector, at which the impinging ions are detected. Ion mobility spectrometers of such a design can be realized particularly compactly in their construction and cost-effectively also because in that case, for example, no additional reaction chamber, as known from DE 10 2015 112 869 A1, need be disposed upstream of the drift chamber. Accordingly, the ion mobility spectrometer can be embodied in such a way that an electric field is generated in the ionization chamber only by the electrodes of the field switching ion gate, with the result that there is no need for an additional field generating device for generating an electric field in the ionization chamber.

The present invention is based on the principle of field switching for feeding the ions from a respective ionization chamber into a respective drift chamber of the ion mobility spectrometer. The term "field switching" or "field switching ion gate" includes the functionality that the provision of the ions to be analyzed, i.e. the ionization of the analyte molecules, takes place in a field-free or at least almost field-free ionization space, such that during this ionization phase the ions provided are not yet moved on account of electric fields in any direction. If an analysis step is then intended to be carried out, the electrodes of the field switching ion gate are correspondingly switched, i.e. at least one electrode is switched, as a result of which the ions are set in motion in the direction of the drift chamber.

In the case of a field switching ion gate, therefore, the ionization chamber is substantially free of electric fields at least during the ionization phase. In order to achieve this state of freedom from fields in the ionization chamber, an identical potential can be present between the counter electrode and the injection electrode of the field switching ion gate. It is also possible to apply a slight potential difference between the counter electrode and the injection electrode in order to compensate for a field punch-through of the electric field from the drift chamber. In this case, however, the potential difference between the counter electrode and the injection electrode precisely does not bring about the generation of an electric field in the ionization chamber, but rather counteracts the punch-through of the field of the drift chamber and thus compensates the state in the ionization chamber in the direction of a field-free state.

The ion mobility spectrometer can comprise one first additional electrode or else a plurality of first additional electrodes. By virtue of the presence of a plurality of first additional electrodes, the advantageous method steps described can also be carried out multiply, e.g. the compression of the ion packet by double field switching can be carried out as multiple field switching in this case.

In accordance with one advantageous development of the invention, it is provided that the first additional electrode is arranged at the end of the first drift chamber facing the first ion gate. In this way, the ion mobility spectrometer can be optimized further with regard to the structural size. Moreover, the first additional electrode can perform its desired function, e.g. for the shielding of the electric field in the drift chamber, particularly effectively.

In accordance with one advantageous development of the invention, it is provided that the distance between the first additional electrode and the first injection electrode is less than the distance between the first counter electrode and the first injection electrode. By this means, too, the structural size of the ion mobility spectrometer and also the effectiveness of the first additional electrode can be increased further. By way of example, as a result, the ion packet can be compressed particularly efficiently in the second compression step, also explained below.

In accordance with one advantageous development of the invention, it is provided that the first additional electrode is embodied in non-potential-switchable fashion. As a result, the construction of the circuit hardware required for the operation of the ion mobility spectrometer is kept simple and the shielding effect is improved. By way of example, the ion mobility spectrometer can be embodied in such a way that potential switching is effected only at the first injection electrode.

The object mentioned in the introduction is additionally achieved by means of an ion mobility spectrometer comprising at least a first drift chamber and a first switchable ion gate for the controlled transfer of ions into the first drift chamber and also a second drift chamber separated from the first drift chamber and a second switchable ion gate for the controlled transfer of ions into the second drift chamber, wherein the first ion gate and/or the second ion gate are/is embodied as a field switching ion gate. In this way, an ion mobility spectrometer with dual polarity can be realized, for example by virtue of the fact that the part comprising the first drift chamber is configured for analyzing positive ions and the part comprising the second drift chamber is configured for analyzing negative ions. The realization of such an ion mobility spectrometer with one or both ion gates as a field switching ion gate makes it possible to achieve a particularly compact construction with at the same time an ultra-high resolution capability and extremely high sensitivity during the measurements.

In accordance with one advantageous development of the invention, it is provided that the first ion gate comprises at least a first counter electrode and a first injection electrode, wherein a first ionization chamber is formed between the first counter electrode and the first injection electrode, into which ionization chamber ions to be analyzed by ion mobility spectrometry are able to be fed from an ionization source. In this case, therefore, the first ion gate is configured as a field switching ion gate. Here, analogously to the previous explanations, the first injection electrode can be arranged closer to the first drift chamber than the first counter electrode.

In accordance with one advantageous development of the invention, it is provided that the second ion gate comprises at least a second counter electrode and a second injection electrode, wherein a second ionization chamber is formed between the second counter electrode and the second injection electrode, into which ionization chamber ions to be analyzed by ion mobility spectrometry are able to be fed from the ionization source. In this case, the second ion gate is configured as a field switching ion gate. Here the second injection electrode can be arranged closer to the second drift chamber than the second counter electrode.

At the end of the first drift chamber facing away from the first injection electrode, the ion mobility spectrometer can comprise a first detector for detecting a first ion species, e.g. positive ions. At the end of the second drift chamber facing away from the second injection electrode, the ion mobility spectrometer can comprise a second detector for detecting a second ion species, e.g. negative ions.

The first ionization chamber formed between the first counter electrode and the first injection electrode can be connected to the second ionization chamber formed between the second counter electrode and the second injection electrode or can be embodied as a common ionization chamber. Independently thereof, but also in combination with these features, it is possible for the ion mobility spectrometer to be embodied with a common ionization source, which provides ions of both polarities in the respective ionization chambers or the common ionization chamber.

In accordance with one advantageous development of the invention, it is provided that the first and second ion gates are formed from an arrangement of at least a first and a second multifunctional electrode, wherein the first multifunctional electrode is disposed upstream of the first drift chamber and the second multifunctional electrode is disposed upstream of the second drift chamber, wherein the first multifunctional electrode forms the injection electrode of the first ion gate and the second multifunctional electrode forms the counter electrode of the first ion gate, and the second multifunctional electrode forms the injection electrode of the second ion gate and the first multifunctional electrode forms the counter electrode of the second ion gate. A particularly simple construction of the ion gates can be realized as a result. A common ionization chamber comprising the first and second ionization chambers can then be formed between the multifunctional electrodes.

In the embodiment explained above with the multifunctional electrodes, it is possible to dispense with pure counter electrodes that only perform the function of a counter electrode. Accordingly, it is possible to achieve a simpler construction of the ion mobility spectrometer with two ion gates, which requires fewer electrodes. The common ionization chamber, which enables a higher yield of positive and negative ions, is additionally advantageous. In order to carry out the methods of extended field switching and extended double field switching, which are also explained below, it is advantageous to provide in each case two first and two second additional electrodes. In this case, the additional electrode situated closest to the respective drift chamber can be kept at a fixed potential; the other additional electrode, arranged closer to the multifunctional electrode, can be switched to different potentials.

The ion mobility spectrometer can be realized in such a way that the first and second drift chambers are arranged one behind the other on identical or at least substantially parallel axes. This results in a comparatively long structural length of the ion mobility spectrometer in conjunction with a small diameter.

In accordance with one advantageous development of the invention, it is provided that the first and second drift chambers are arranged substantially parallel next to one another. As a result, the structural size of the ion mobility spectrometer can be reduced further. In particular, the structural length is substantially halved compared with the embodiment explained above. In the case of this design, the arrangement of the electrodes of the respective ion gates can be interchanged, i.e. in this case the first counter electrode can be arranged closer to the first drift chamber than the first injection electrode, and the second counter electrode can be arranged closer to the second drift chamber than the second injection electrode.

In accordance with one advantageous development of the invention, it is provided that the first and second counter electrodes are short-circuited with one another or are embodied as a common counter electrode. As a result, the construction of the ion mobility spectrometer can be optimized further, both with regard to the structural size and with regard to the components required. Moreover, the electrical construction can be simplified further. This embodiment is suitable e.g. for an ion mobility spectrometer in which the first and second drift chambers are arranged one behind the other on identical or at least substantially parallel axes. Alternatively, it can also be provided that the first and second injection electrodes are short-circuited with one another or are embodied as a common injection electrode. This is advantageous e.g. if the first and second drift chambers are arranged substantially parallel next to one another.

In accordance with one advantageous development of the invention, it is provided that
a) at least one first additional electrode is arranged between the first ion gate and the first drift chamber, ions to be transferred into the first drift chamber by means of the first ion gate additionally being able to be influenced by said first additional electrode,
and/or
b) at least one second additional electrode is arranged between the second ion gate and the second drift chamber, ions to be transferred into the second drift chamber by means of the second ion gate additionally being able to be influenced by said second additional electrode.

Consequently, one or a plurality of first additional electrodes and/or one or a plurality of second additional electrodes can be present. The number of first and second additional electrodes respectively present can be different, i.e. the ion mobility spectrometer can also be embodied asymmetrically with regard to the equipping of the individual IMS tubes with additional electrodes.

In accordance with one advantageous development of the invention, it is provided that the first additional electrode and/or the second additional electrode are/is embodied in potential-switchable fashion. This is advantageous in particular if extended field switching is intended to be carried out. As a result, the potential of the respective additional electrode can be adapted if the detector potential or the gradient in the drift chamber is adapted in the context of extended field switching.

In accordance with one advantageous development of the invention, it is provided that the ion mobility spectrometer comprises as ionization source an X-ray ionization source, an ultraviolet (UV) ionization source, a corona ionization source, a plasma ionization source, a dielectric barrier discharge source and/or an electron emitter. In this way, the abovementioned high sensitivity and resolution capability, particularly in association with a field switching ion gate, can be promoted further.

The ionization source can be arranged for example laterally next to the respective ionization chamber. In this case, it is advantageous to use an ionization source having a large penetration depth or at least a large aperture angle. It is also possible to combine the ionization source with the counter electrode (first and/or second counter electrode), e.g. by structural integration of the ionization source into the counter electrode or embodiment of the counter electrode as ionization source.

The ionization source can be a non-radioactive ionization source or a radioactive ionization source. By way of example, the counter electrode can be coated with a radioactive material.

Insofar as general explanations are given concerning a field switching ion gate and its counter electrode and injection electrode, this is applicable both to the first ion gate and to the second ion gate, that is to say likewise to the first and second counter electrodes and the first and second injection electrodes. The above-explained embodiments of the ion mobility spectrometer with the first additional electrode are advantageously combinable both in the case of an ion mobility spectrometer with single polarity (with only one drift chamber) and in the case of the described embodiment with the first and second drift chambers. In the last-mentioned case, a second additional electrode can then be disposed upstream of the second drift chamber.

The object mentioned in the introduction is additionally achieved by means of a method for analyzing samples by ion mobility spectrometry by means of an ion mobility spectrometer of the type explained above, wherein by means of an ionization source ions to be analyzed are generated from the sample and are provided in the first ionization chamber, and the ions generated in the process are guided, under the control of the first ion gate, through the first drift chamber to a first ion detector, wherein the first ionization chamber is substantially free of electric fields at least during an ion generating period, characterized by one or both of the following features a), b):
a) an ion packet provided in the first ionization chamber is compressed a first time in a first compression step by switching of the potential difference between the first injection electrode and the first counter electrode and, after passing the first injection electrode, is compressed at least a second time in a second compression step by switching of the potential difference between the first additional electrode and the first injection electrode before the ion packet is transferred into the first drift chamber,
b) ions generated in the first ionization chamber are substantially shielded from portions of an electric field generated in the first drift chamber by the first additional electrode or at least an additional shielding electrode at least during the ion generating period.

In this way, it is possible to realize advantageous methods of double field switching or multiple field switching (feature a)), extended field switching (feature b)) or, in a manner combined therefrom, extended double field switching (combination of features a) and b)). By means of these methods, the resolution capability of an ion mobility spectrometer can be increased without the need for lengthening—otherwise required—of the drift chamber. It is likewise possible to construct ion mobility spectrometers having a comparable resolution capability more compactly, that is to say with a shorter drift chamber.

As a result of the ionization by means of the ionization source, ions to be analyzed are provided in the first ionization chamber. These ions provided are also referred to as an ion packet. By means of the switching of the ion gate, that is to say for example the electrodes of a field switching ion gate, the ions of the ion packet are moved in the direction of the drift chamber and compressed a first time in the process. In this case, the term compression relates to the extent of the ion packet in the desired direction of flight, that is to say in the drift direction through the drift chamber. As a result of the compression of the ion packet, the latter becomes narrower, which leads to an increase in the resolution capability of the ion mobility spectrometry. By using the first additional electrode in the second compression step for further (second) compression of the ion packet, the latter, upon transfer into the drift chamber, can be made even narrower than in ion mobility spectrometry methods from the prior art. The second compression step can be followed by one or more further compression steps (multiple field switching) in order to make the ion packet even narrower. In many cases, however, the second compression step will be sufficient for practical application.

The first compression step can be effected by generating an electric field in the ionization chamber by means of the ion gate, that is to say by generating a potential difference between the injection electrode and the counter electrode. The second compression step can be effected by generating a further electric field between the ionization chamber and the drift chamber. For this purpose, it is possible for example to generate a potential difference between the injection electrode and the additional electrode.

In the case of ion mobility spectrometers of the type explained above, particularly when a field switching ion gate is used, a field punch-through of the electric field present in the drift chamber into the ionization chamber can occur, particularly if the injection electrode is arranged very close to the drift chamber, which is desired, of course, in order to achieve a small structural size. Under certain circumstances, ions in the region of influence of the field punch-through may already enter the drift chamber, which results in a certain transmissivity of the ion gate even in the closed state. As a result, small leakage currents into the drift chamber can occur, which can result in a significant reduction of the sensitivity and selectivity of the ion mobility spectrometer. In order to counteract this effect, it is conceivable to generate in the ionization chamber a very low electric field opposite to the field of the drift chamber, e.g. by applying a so-called blocking voltage to the counter electrode. However, this has the effect that the ions in the ionization chamber are moved in the direction of the counter electrode, which indeed prevents the ions from passing through the closed ion gate to a certain extent, but leads to ion losses at the counter electrode. This also reduces the sensitivity of the ion mobility spectrometer. Moreover, an additional discrimination of specific ion species can occur. This can be prevented by the extended field switching method according to the invention, specifically by the shielding of the ions generated in the ionization chamber by the first additional electrode or at least an additional shielding electrode. The first additional electrode or the shielding electrode is then arranged behind the first injection electrode, as viewed from the ionization chamber. In this way, the ionization chamber can still be operated substantially free of an electric field as long as the ion gate is closed. The undesired passage of ions through the closed ion gate is nevertheless prevented since the region of the field punch-through is shielded by the ionization chamber. By this means, therefore, in a simple manner, the sensitivity and selectivity of the ion mobility spectrometer can be increased and the undesired discrimination of specific ion species can be avoided.

The object mentioned in the introduction is additionally achieved by means of a method for analyzing samples by ion mobility spectrometry, wherein by means of an ionization source ions to be analyzed are generated from the sample and are provided in a first and/or second ionization chamber, and the positive and negative ions generated in the process, under the control of a respective first and second ion gate, are guided through separate drift chambers to respective separate ion detectors, wherein the first and/or second ionization chamber are/is substantially free of electric fields at least during an ion generating period. By this means, too, the advantages associated with a field switching ion gate can be realized.

The methods already explained can be used in any embodiment of the ion mobility spectrometer explained above.

In accordance with one advantageous development of the invention, it is provided that the first and second counter electrodes have the same potential. As a result, the electrical circuit construction for driving the ion gate and also the construction of the ion gate itself are simplified.

In accordance with one advantageous development of the invention, it is provided that the opening and closing of the first and/or second ion gate is effected by potential switching of the injection electrode and/or of the counter electrode of the respective ion gate. By this means, too, the electrical driving of the ion gate is simplified. Further potential switchings at other electrodes or at a plurality of electrodes can be avoided.

In accordance with one advantageous development of the invention, it is provided that in the first compression step the potential gradient between the first counter electrode and the first injection electrode is greater than the potential gradient in the drift chamber. An efficient compression of the ion packet in the first compression step can be achieved as a result.

In accordance with one advantageous development of the invention, it is provided that in the second compression step the potential gradient between the first injection electrode and the first additional electrode is greater than the potential gradient in the drift chamber. An efficient compression of the ion packet in the second compression step can be achieved as a result.

In accordance with one advantageous development of the invention, it is provided that the potential gradient between the first injection electrode and the first additional electrode is greater in the second compression step than in the first compression step. A particularly great compression of the ion packet in the second compression step can be achieved as a result.

In accordance with one advantageous development of the invention, it is provided that in the first compression step the potential gradient between the first injection electrode and the first additional electrode is substantially equal to the potential gradient of the drift chamber. A uniform transfer of the ion packet from the ion gate into the drift chamber can be realized in this way.

In accordance with one advantageous development of the invention, it is provided that in the first compression step the potential gradient between the first injection electrode and the first additional electrode is greater than the potential gradient between the first counter electrode and the first injection electrode and greater than the potential gradient of the first drift chamber. An ion focusing can advantageously be achieved in this way, which can be used e.g. in extended field switching.

In accordance with one advantageous development of the invention, it is provided that the potential gradient between the first injection electrode and the electrode used for shielding, i.e. the first additional electrode or the shielding electrode, is equal to zero or opposite to the potential gradient in the drift chamber at least during the ion generating period. By this means, it is possible to realize a good shielding effect in extended field switching, without appreciable ion losses occurring.

In accordance with one advantageous development of the invention, it is provided that upon switching to the first compression step the potential gradient between the first injection electrode and the first additional electrode is switched later than the potential gradient between the first counter electrode and the first injection electrode. Undesired fast ions can be eliminated in this way.

In accordance with one advantageous development of the invention, it is provided that upon leaving the first compression step, i.e. for example upon changing to the second compression step, the potential gradient between the first counter electrode and the first injection electrode is switched earlier than the potential gradient between the first injection electrode and the first additional electrode. Undesired slow ions can be eliminated in this way.

In this case, potential gradient is understood to mean the gradient of the potential in the direction of the longitudinal axis of the drift chamber or in the desired drift direction of the ions in the drift chamber.

In the case of an ion mobility spectrometer having a second drift chamber, e.g. in the case of dual polarity, the features mentioned above with regard to the first ion gate, the first counter electrode, the first injection electrode, the first additional electrode and the first drift chamber are also applicable as advantageous developments of the corresponding components of the second ion gate, that is to say of the second counter electrode, the second injection electrode and the second additional electrode, and/or the second drift chamber.

The invention is explained in greater detail below on the basis of exemplary embodiments using drawings.

In the figures:

FIG. 1 shows an ion mobility spectrometer having two drift chambers and

Figure 2:
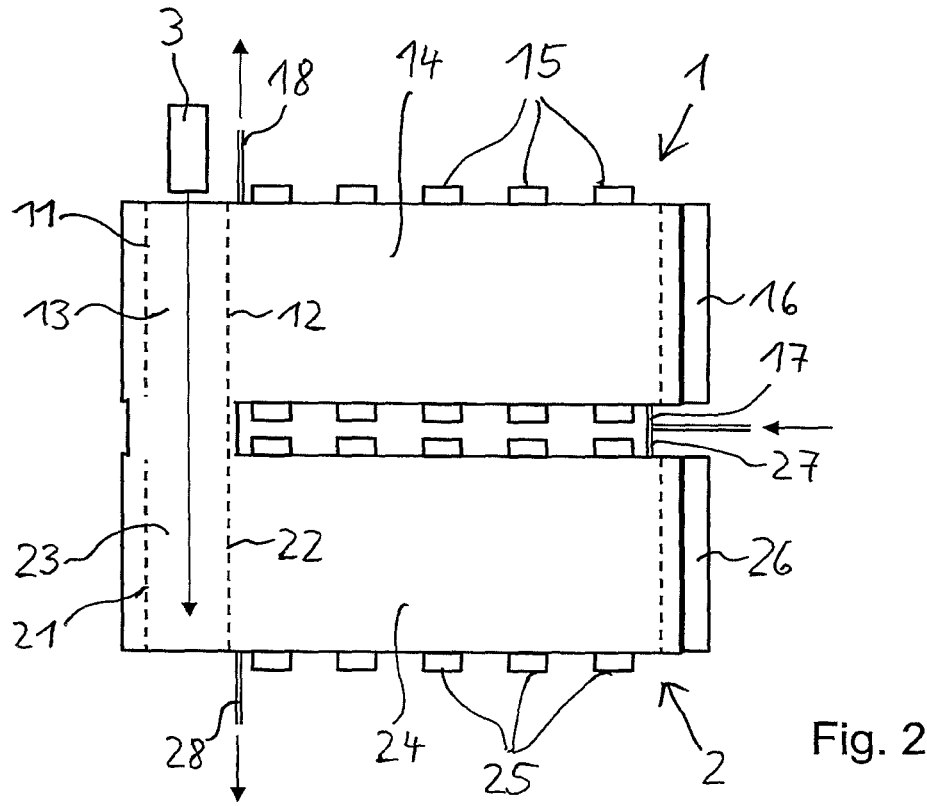
Figure 3:
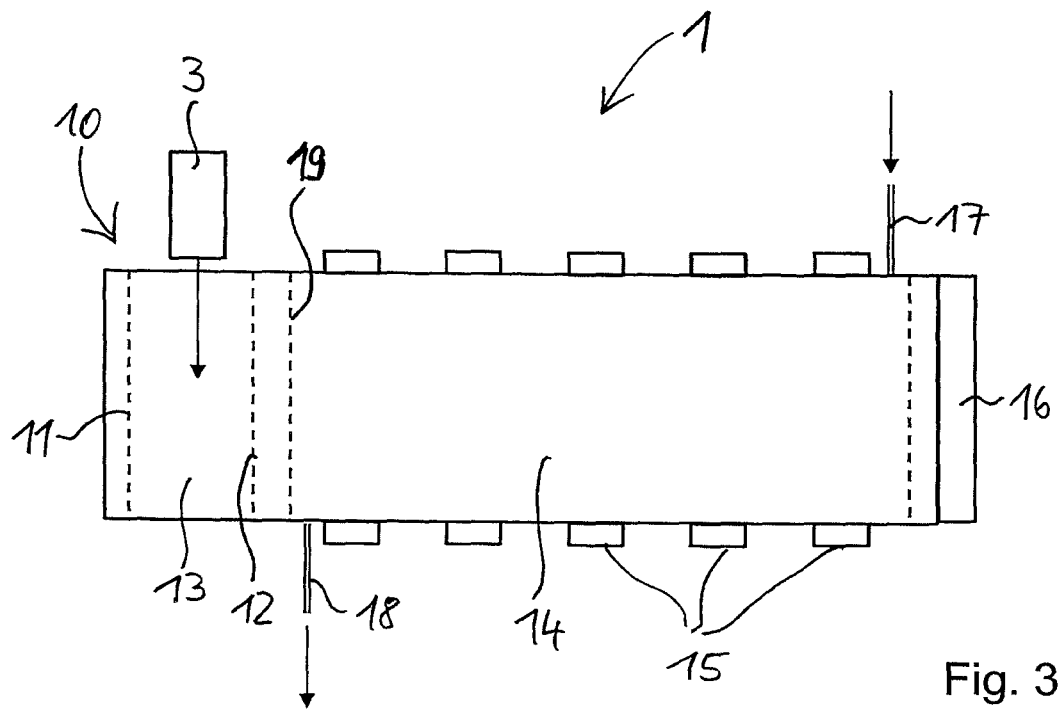
Figure 4:
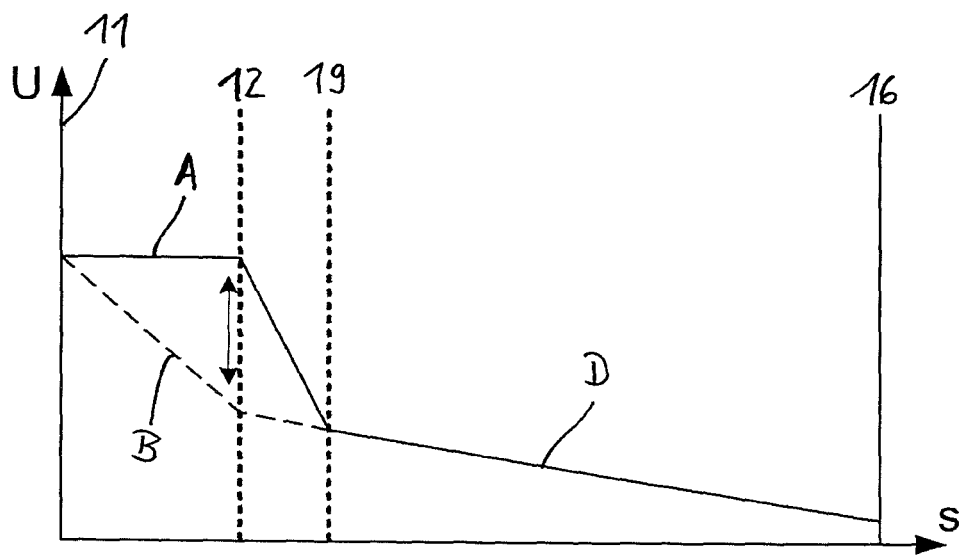
Figure 5:
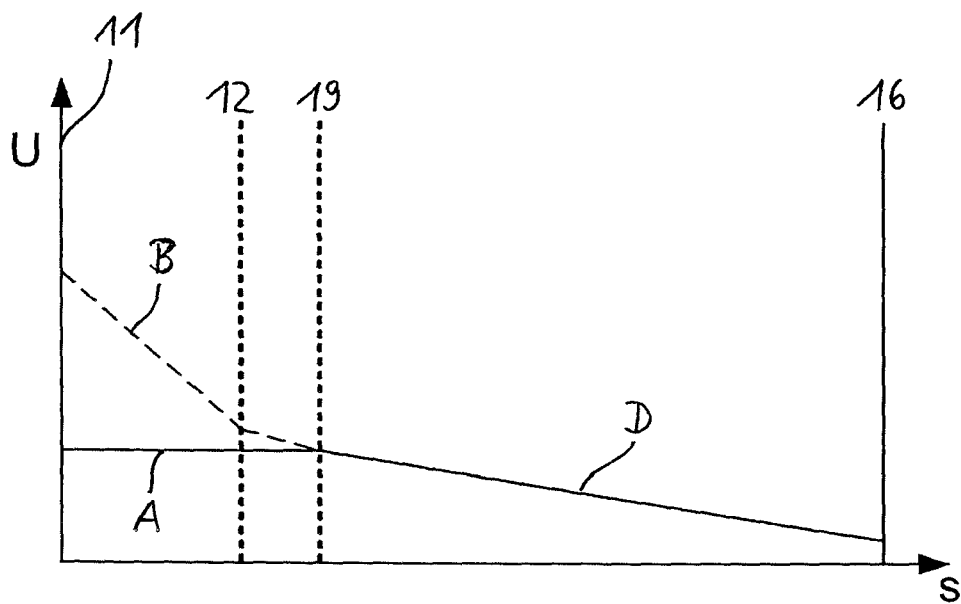
Figure 6:
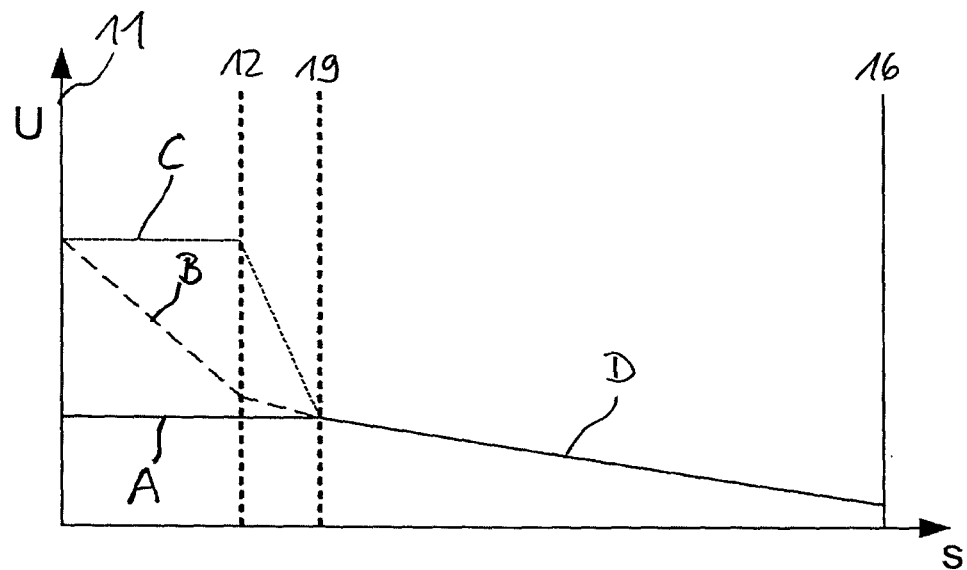
Figure 10:
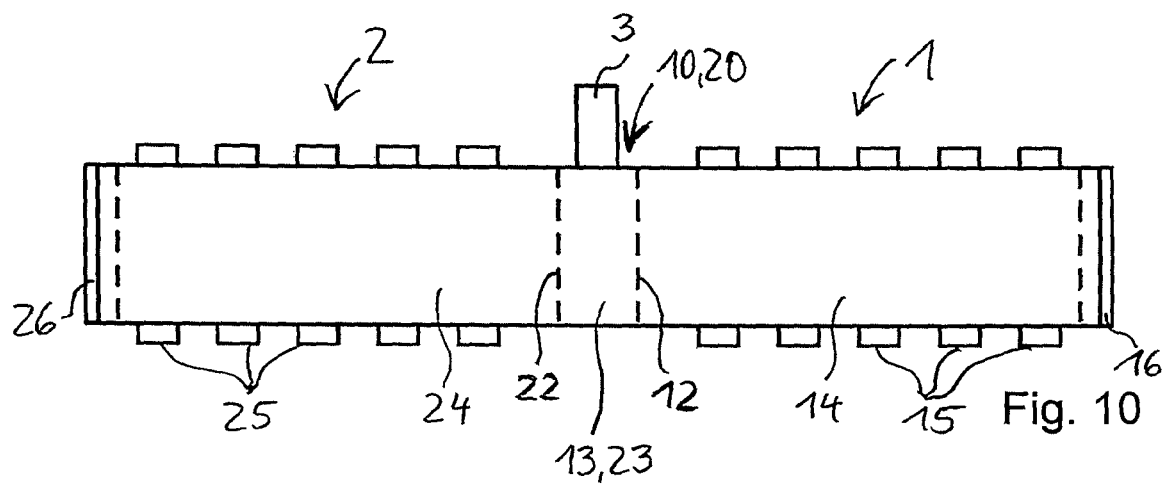
Figure 11:
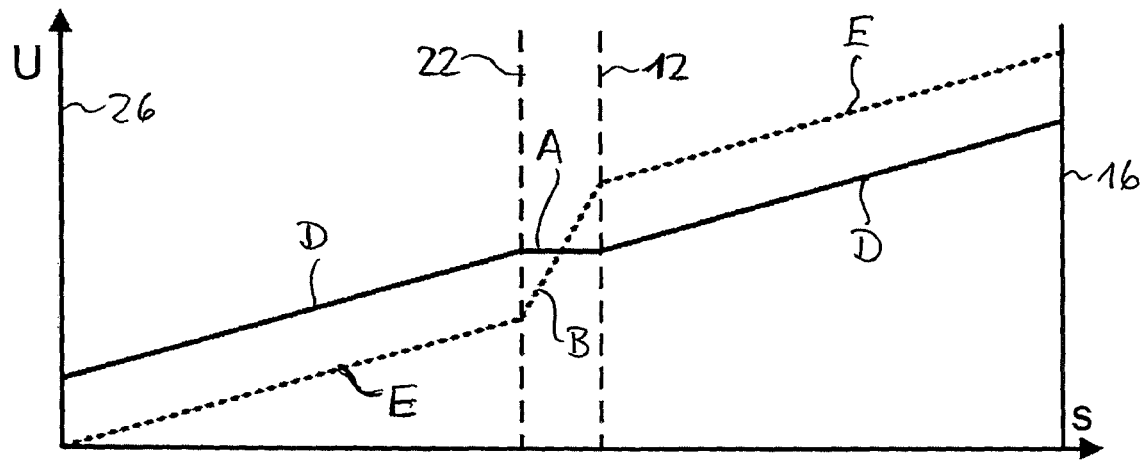
Figure 12:
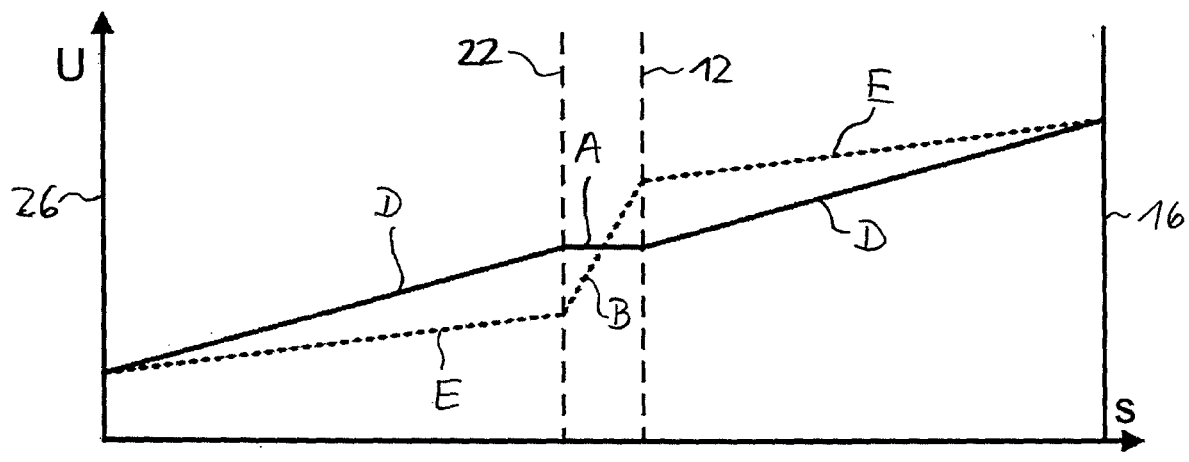
Figure 13:
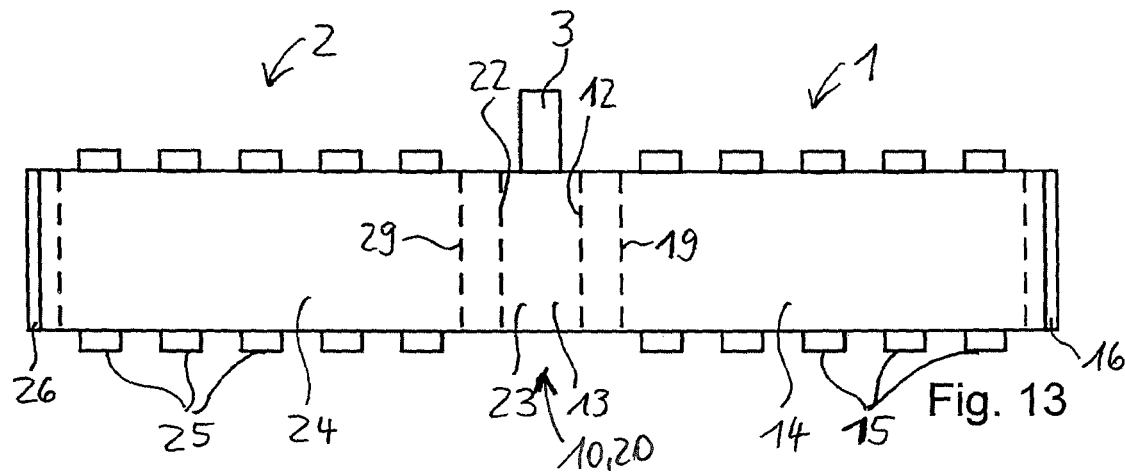
Figure 14:
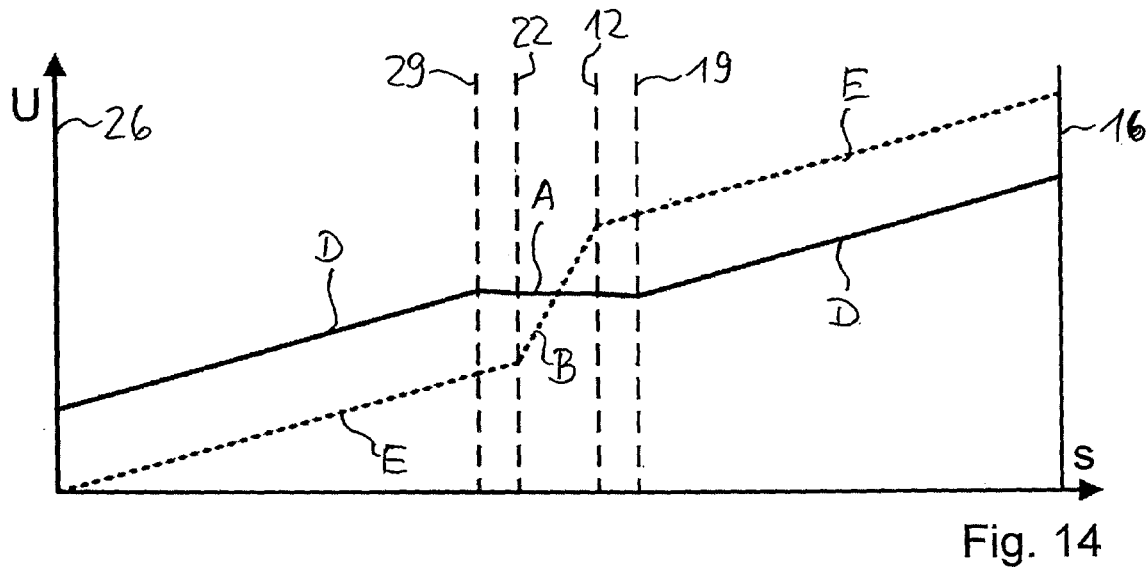
Figure 15:
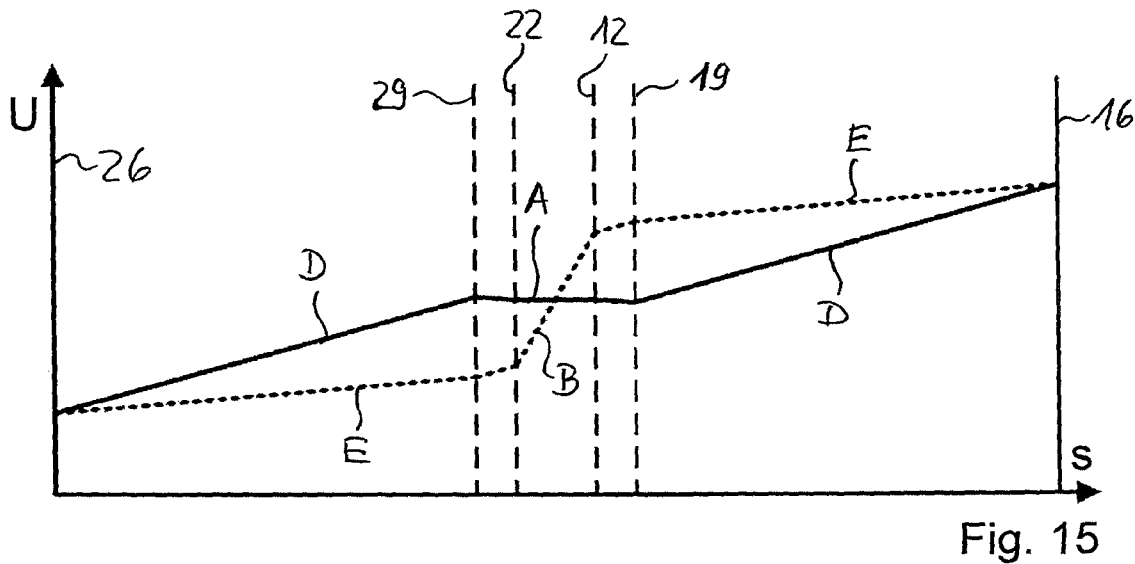
Figure 16:
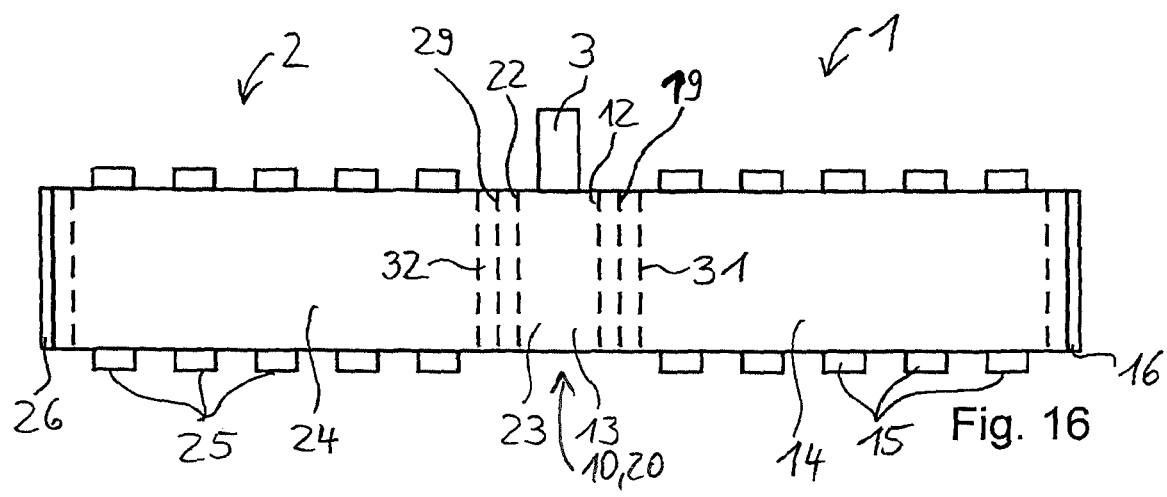
Figure 17:
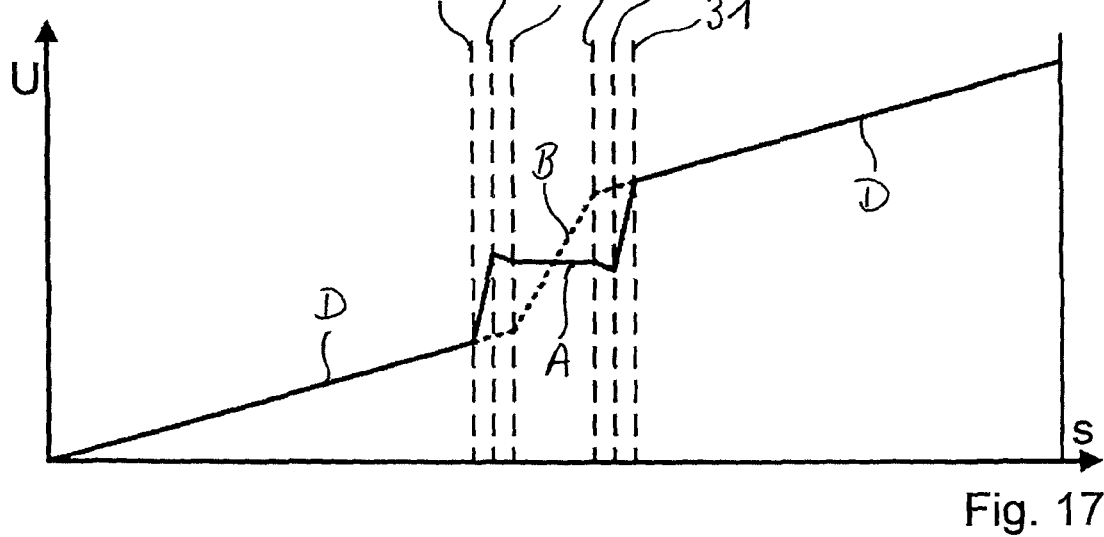
Figure 18:
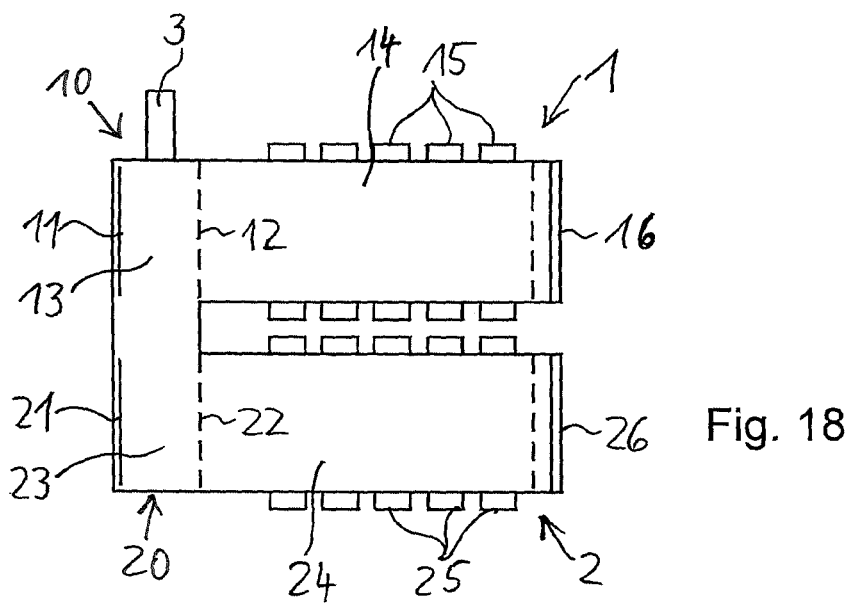
Figure 23:
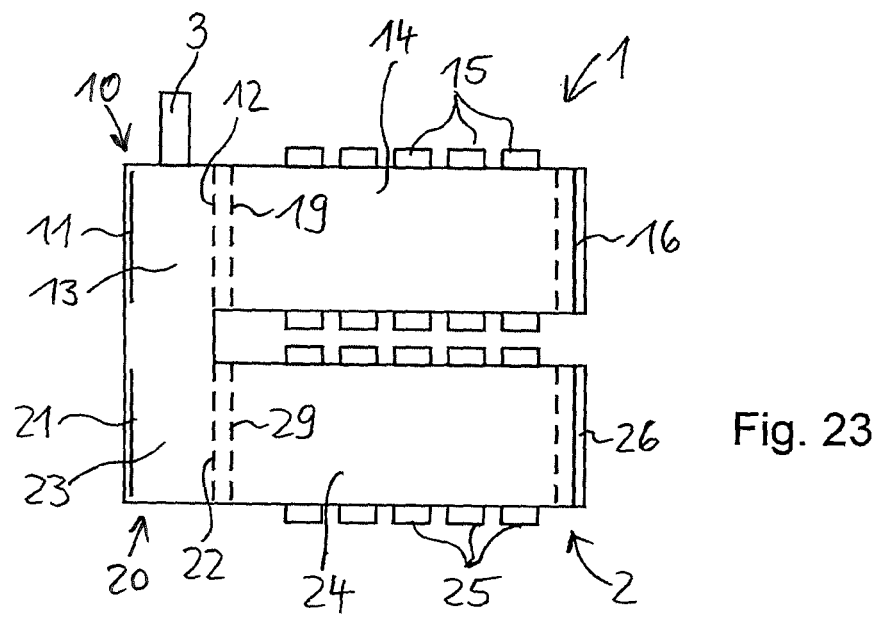

FIG. 2 shows a further embodiment of an ion mobility spectrometer having two drift chambers and FIG. 3 shows an ion mobility spectrometer having one drift chamber and FIG. 4 shows an exemplary potential profile in the ion mobility spectrometer in accordance with FIG. 3 during double field switching and FIG. 5 shows an exemplary potential profile in the ion mobility spectrometer in accordance with FIG. 3 during extended field switching and FIG. 6 shows an exemplary potential profile in the ion mobility spectrometer in accordance with FIG. 3 during extended double field switching and FIG. 7 shows a further embodiment of an ion spectrometer having two drift chambers and FIG. 8 shows a further embodiment of an ion mobility spectrometer having two drift chambers and FIG. 9 shows an exemplary potential profile in the ion mobility spectrometer in accordance with FIG. 8 during normal or double field switching and FIG. 10 shows an embodiment of an ion mobility spectrometer having two drift chambers and two multifunctional electrodes and FIGS. 11, 12 show exemplary potential profiles in the ion mobility spectrometer in accordance with FIG. 10 and FIG. 13 shows an ion mobility spectrometer having two drift chambers and FIGS. 14, 15 show exemplary potential profiles in the ion mobility spectrometer in accordance with FIG. 13 during extended field switching and FIG. 16 shows an ion mobility spectrometer having two drift chambers in an embodiment and FIG. 17 shows an exemplary potential profile in the ion mobility spectrometer in accordance with FIG. 16 and FIG. 18 shows an ion mobility spectrometer having two drift chambers in a parallel arrangement and FIGS. 19 to 22 show exemplary potential profiles in the ion mobility spectrometer in accordance with FIG. 18 and FIG. 23 shows a further embodiment of an ion mobility spectrometer having two drift chambers in a parallel arrangement and FIGS. 24 to 27 show exemplary potential profiles in the ion mobility spectrometer in accordance with FIG. 23 and FIG. 28 shows a further embodiment of an ion mobility spectrometer having two drift chambers in a parallel arrangement and FIGS. 29 to 32 show exemplary potential profiles in the ion mobility spectrometer in accordance with FIG. 28.

FIG. 1 shows an ion mobility spectrometer 1, 2 having a substantially coaxial arrangement of two IMS tubes 1, 2. The IMS tube 1 comprises a first ion gate 10 comprising a first counter electrode 11 and a first injection electrode 12. A first ionization chamber 13 is formed between the first injection electrode 12 and the first counter electrode 11. Behind the first injection electrode 12, a first drift chamber 14 is adjacent to the first ionization chamber 13, and ends at a first ion detector 16. In the region of the first drift chamber 14, a first field generating device 15 is present, e.g. in the form of ring electrodes surrounding the first drift chamber 14. The first field generating device 15 can generate an electric field in the first drift chamber 14 which exerts the desired drift effect on the ions to be examined, such that the latter are transported from the first ion gate 10 to the first ion detector 16. A drift gas can flow through the first drift chamber 14, e.g. in the opposite direction to the drift direction of the ions. For this purpose, the first IMS tube 1 comprises a first drift gas inlet connection 17 and a first drift gas outlet connection 18. The drift gas can be introduced into the IMS tube 1 at the first drift gas inlet connection 17. The drift gas can be discharged from the IMS tube 1 at the first drift gas outlet connection 18.

The ion mobility spectrometer or the first and second IMS tubes 1, 2 can comprise additional connections for introducing and discharging a sample gas. These connections can be arranged for example in the region of the first ionization chamber 13 and/or the second ionization chamber 23.

The second IMS tube 2 is constructed in a comparable manner to the first IMS tube 1, but is arranged mirror-symmetrically with respect thereto. The second IMS tube 2 comprises a second ion gate 20 having a second counter electrode 21 and a second injection electrode 22, wherein a second ionization chamber 23 is formed between the second injection electrode 22 and the second counter electrode 21. Further components of the second IMS tube 2 are a second drift chamber 24, a second field generating device 25, a second ion detector 26, a second drift gas inlet connection 27 and a second drift gas outlet connection 28. The corresponding elements of the second IMS tube 2 have the same function as explained above for the components of the first IMS tube 1. The first IMS tube 1 can be used e.g. for the analysis of positive ions, and the second IMS tube 2 for the analysis of negative ions.

In this case, the first and second counter electrodes 11, 21 can also be embodied as a common counter electrode or as electrically interconnected counter electrodes.

The ion mobility spectrometer additionally comprises an ionization source 3, which provides ions in the first and second ionization chambers 13, 23. The first and second ion gates 10, 20 are each embodied as a field switching ion gate.

FIG. 2 shows one advantageous embodiment of an ion mobility spectrometer, which likewise comprises a first and a second IMS tube 1, 2 and, for the rest, includes the components already explained with reference to FIG. 1. In contrast to the embodiment in FIG. 1, in FIG. 2 the IMS tubes 1, 2 are arranged substantially parallel next to one another, thus resulting in a shorter structural length of the arrangement. In this case, it is possible to form a common ionization chamber made from the first ionization chamber 13 and a second ionization chamber 23, which is supplied with ions by a common ionization source 3 as in the embodiment in FIG. 1. In the embodiment in accordance with FIG. 2, the first and second ion gates 10, 20 can each be constructed in a manner identical to that in the embodiment in FIG. 1, i.e. in such a way that the respective injection electrode is arranged closer to the drift chamber facing the ion gate than the respective counter electrode. FIG. 2 shows a modified arrangement in this regard, in which the positions of the injection electrode and the counter electrode of a respective ion gate 10, 20 are interchanged. It is evident that the first injection electrode 12 is further away from the first drift chamber 14 and the first counter electrode 11 is arranged closer to the first drift chamber 14. In a comparable manner, the second injection electrode 22 is further away from the second drift chamber 24, and the second counter electrode 21 is closer to the second drift chamber 24. This makes it possible for the first and second counter electrodes 11, 21 to be embodied as a common counter electrode or at least as electrically interconnected counter electrodes. This simplifies the construction of the ion mobility spectrometer and the circuit construction required for the electrical operation of the ion mobility spectrometer.

FIG. 3 shows an ion mobility spectrometer having only one IMS tube 1. The ion mobility spectrometer has a construction comparable to the first IMS tube 1 of the embodiment in FIG. 1, specifically with the components of first ion gate 10 comprising the first counter electrode 11 and the first injection electrode 12, between which the first ionization chamber 13 is formed, and also the first drift chamber 14 adjacent to the first ion gate 10, the first field generating device 15 being arranged in the region of said first drift chamber. The first ion detector 16 is arranged at the end of the first drift chamber 14. The first drift gas inlet connection 17 and the first drift gas outlet connection 18 are furthermore present.

As an additional element, the ion mobility spectrometer in accordance with FIG. 3 comprises an additional electrode 19, which is arranged behind the first injection electrode 12 as viewed from the first counter electrode 11, e.g. at the beginning of the first drift chamber 14. The first additional electrode 19 can be embodied similarly to the first injection electrode 12 or the first counter electrode 11, e.g. as a ring electrode or as a grid electrode. By applying a suitable electrical potential to the first additional electrode 19 and by switching at least one other potential of the first ion gate 10, e.g. the potential at the first injection electrode 12, it is possible to realize methods for double field switching, for extended field switching and for extended double field switching. This is explained below with reference to the timing diagrams in FIGS. 4 to 6.

FIGS. 4 to 6 illustrate an electrical potential difference U against the longitudinal extent s of the IMS tube 1. The potential difference U is the respective potential difference with respect to the first ion detector 16. The positions of the first counter electrode 11, the first injection electrode 12, the first additional electrode 19 and the first ion detector 16 are represented by vertical lines. In all the examples in FIGS. 4 to 6 it is assumed that a linear potential profile with a comparatively low potential gradient D and accordingly a low field strength of the electric field is present in the first drift chamber 14.

FIG. 4 shows one example for double field switching. In this case, the potential of the first injection electrode 12 is switched back and forth between two values. The solid line A represents the potential profile for which no electric field is present in the first ionization chamber 13 because no potential difference is generated between the first counter electrode 11 and the first injection electrode 12. In this phase, ions to be analyzed can be generated and provided in the first ionization chamber 13 by means of the ionization source 3. The first ion gate 10 is thus closed in this state.

If a sufficient quantity of ions to be analyzed has accumulated in the first ionization chamber 13, the potential at the first injection electrode 12 is switched, such that the potential profile represented by the dashed line B is established. The ion packet situated in the first ionization chamber 13 is then moved from the first ionization chamber 13 in the direction toward the first drift chamber 14 as a result of the falling potential profile. A first compression of the ion packet is effected in this case. After a specific period of time when it can be assumed that the ion packet has passed the first injection electrode 12 but has not yet passed the first additional electrode 19, the potential at the first injection electrode 12 is switched again to the value present first, such that the potential profile represented by the solid line A arises again. In this state, as mentioned, the field strength in the first ionization chamber is substantially equal to zero. In the space between the first injection electrode 12 and the first additional electrode 19, a relatively steep potential gradient is then present, thus a relatively strong electric field, which results in a second compression of the ion packet situated in this interspace. This ion packet which has now been compressed for a second time is then transferred into the first drift chamber 14.

It is additionally evident in FIG. 4 that it can be advantageous to define the second potential value, which is applied to the first injection electrode 12 and which results in the potential profile in accordance with the dashed line B, in such a way that in this operating phase the potential gradient between the first injection electrode 12 and the first additional electrode 19 is at least substantially equal to the potential gradient D in the first drift chamber 14. A homogeneous transfer of the ion packet from the interspace between the first injection electrode 12 and the first additional electrode 19 into the first drift chamber 14 is ensured in this way.

FIG. 5 shows one example for extended field switching. Here, too, the potential of the first injection electrode 12 is switched back and forth between two different values. It shall firstly be assumed that a potential value that leads to the potential profile represented by the solid line A is applied to the first injection electrode 12. In this state, the first ion gate 10 is in the closed state, i.e. the first ionization chamber 13 is substantially field-free. Moreover, the potential at the first injection electrode 12 is chosen such that in the interspace, too, between the first injection electrode 12 and the first additional electrode 19 the potential is constant and, consequently, this space is also substantially field-free. A field punch-through, resulting from the potential gradient D in the first drift chamber 14, into the first ionization chamber 13 can be prevented in this way.

The potential at the first injection electrode 12 is then switched to a different value, such that the potential profile represented by the dashed line B is established. In this case, the potential gradient between the first counter electrode 11 and the first injection electrode 12 corresponds for example to the potential profile represented by the dashed line B in FIG. 4; likewise, the potential profile between the first injection electrode 12 and the first additional electrode 19 can correspond to the potential profile represented by the dashed line B with reference to FIG. 4. In this state, therefore, the first ion gate is switched to transmission, such that the ion packet is moved from the first ionization chamber 13 to the first drift chamber 14.

FIG. 6 shows exemplary potential profiles in the case of extended double field switching, hence a combination of the methods explained above with reference to FIGS. 4 and 5. In this case, the potential at the first injection electrode 12 is switched between three different values. It shall be assumed that the sequence begins with the potential profile in accordance with a solid line A. In this state, the first ion gate 10 is closed or, to put it another way, this state corresponds to the state explained above with reference to FIG. 5 in accordance with the solid line A therein. The first ionization chamber 13 and also the interspace between the first injection electrode 12 and the first additional electrode 19 are substantially field-free. As a result, the first additional electrode 19 can perform its function for shielding against the field punch-through from the first drift chamber 14.

The potential at the first injection electrode 12 is then switched, such that the potential profile represented by the dashed line B arises. In this state, the first ion gate 10 is open. The ion packet that has accumulated in the first ionization chamber 13 is moved in the direction toward the first drift chamber 14 and compressed a first time in the process. This corresponds to the sequence that likewise arises in the case of the potential profile in accordance with the dashed line B in the examples explained above with reference to FIGS. 4 and 5.

The potential of the first injection electrode 12 is then switched a further time, such that the potential profile represented by the dotted line C arises. In this state, the first ion gate 10 is once again closed. Accordingly, the first ionization chamber 13 is substantially field-free. However, in contrast to the potential profile represented by the solid line A, this field-free state of the first ionization chamber 13 is attained at a higher potential value. Accordingly, in the interspace between the first injection electrode 12 and the first additional electrode 19 a comparatively strong electric field is present, i.e. a significant potential gradient, such that ions situated in this interspace are compressed a second time before they are transferred into the first drift chamber 14. In this case, the potential profile in accordance with the dotted line C can correspond for example to the potential profile in accordance with the solid line A in FIG. 4.

The potential at the first injection electrode 12 is then switched again to the value mentioned first, such that the potential profile in accordance with the solid line A in FIG. 6 is established.

FIG. 7 shows a further embodiment of an ion mobility spectrometer having two drift chambers, which are arranged one behind the other, i.e. as in the embodiment in FIG. 1. In contrast to the embodiment in FIG. 1, the ion mobility spectrometer in FIG. 7 comprises a first additional electrode 19 in the IMS tube 1 and a second additional electrode 29 in the IMS tube 2. As a result, an ion mobility spectrometer having two drift chambers, e.g. an ion mobility spectrometer with dual polarity, can be provided, which has a corresponding functionality for carrying out double field switching, extended field switching and extended double field switching. In this case, the potentials at the respective injection electrode of the first and second ion gates 10, 20 are to be switched in a corresponding manner as explained above for the embodiment in FIG. 3 with only one IMS tube 1. It goes without saying that the potentials at the first and second injection electrodes 12, 22 are to be switched in an opposite way if the intention is to analyze ions having different polarities in the individual IMS tubes 1, 2.

FIG. 8 shows a further embodiment of an ion mobility spectrometer, which is similar to the embodiment of FIG. 7. In contrast to FIG. 7, the first and second counter electrodes 11, 21 are omitted. Accordingly, a common ionization chamber made from the first and second ionization chambers 13, 23 is also formed. As a result, the construction of the ion mobility spectrometer is simplified. In addition, ion losses can be minimized even further. The full functionality of an ion mobility spectrometer can nevertheless be realized, including the above-explained extensions of double field switching, extended field switching and extended double field switching.

FIG. 9 shows exemplary potential profiles of the ion mobility spectrometer in accordance with FIG. 8 when double field switching is realized. Analogously to the illustrations in FIGS. 4 to 6, once again the potential difference U against the longitudinal extent s of the ion mobility spectrometer is illustrated. Moreover, the positions of the first and second ion detectors 16, 26, the first and second injection electrodes 12, 22 and the first and second additional electrodes 19, 29 are illustrated. Here in each case the potential at the first injection electrode 12 and the second injection electrode 22 is switched back and forth between two different values. The potential profile with the solid line A represents the state with closed ion gates 10, 20. In the common ionization chamber, a field-free space is thus present and the ions can be provided by the ionization source 3.

The potentials at the first injection electrode 12 and the second injection electrode 22 are then switched in an opposite way, such that the potential profile represented by the dashed line B arises. In this way, the positive and negative ions are separated from one another and transported as respective separate ion packets in the direction toward the respective first or second drift chamber 14, 24. A first compression of the respective ion packet is effected in this case.

Once the respective ion packet has passed the injection electrode 12 or 22 respectively assigned to it, the potential profile can be switched again to the profile in accordance with the solid line A. In this state, a relatively steep potential gradient is present in the respective interspaces of first injection electrode 12/first additional electrode 19 and second injection electrode 22/second additional electrode 29. A second compression of the respective ion packet is effected as a result. In this case, the sequence corresponds to the sequence already explained for the one IMS tube 1 with reference to FIG. 4. The same sequence results for the second IMS tube 2, but with opposite polarity.

In the case of such an ion gate comprising an injection electrode and a counter electrode, in many applications the injection electrode is arranged closer to the drift chamber assigned to the ion gate than the counter electrode. In some applications, e.g. in the case of an ion mobility spectrometer with dual polarity, the arrangement can also be reversed, i.e.

in such cases the counter electrode is arranged closer to the drift chamber assigned to the ion gate than the injection electrode.

Even if no first and second counter electrodes are present as a separate component in the embodiment of the ion mobility spectrometer in accordance with FIG. 8, the function of the respective counter electrodes is nevertheless present in the case of the described function of the switching of the potentials at the injection electrodes. With regard to the IMS tube 1, to which the first ion gate 10 is assigned, the second injection electrode 22 performs the function of the first counter electrode. In a corresponding manner, for the second IMS tube 2, to which the second ion gate 20 is assigned, the first injection electrode 12 performs the function of the second counter electrode. As is evident, the first and second injection electrodes 12, 22 in this embodiment have the functionality of the first and second multifunctional electrodes explained above.

It is also possible to switch the potentials separately at the respective counter electrode and the respective injection electrode of an ion gate and to carry out the method of double field switching, extended field switching and/or extended double field switching using the arrangement composed of the three electrodes mentioned, i.e. counter electrode, injection electrode and additional electrode.

FIG. 10 shows an ion mobility spectrometer having two drift chambers 14, 24 arranged in axial alignment, which spectrometer is simplified to an even greater extent than the embodiment explained with reference to FIG. 8. The embodiment in accordance with FIG. 10 once again comprises the two multifunctional electrodes formed by the first injection electrode 12 and the second injection electrode 22. In contrast to the embodiment in FIG. 8, the embodiment in FIG. 10 lacks the first and second additional electrodes 19, 29. Even with this still further simplified embodiment of a dual ion mobility spectrometer, it is possible to realize the desired functionality in ion analysis.

FIG. 11 shows one embodiment of the potential profiles in the drift chambers 14, 24 and in the common ionization chamber 13, 23. In accordance with FIG. 11, during the ion generating period substantially the same potential profile as in the embodiment in FIG. 8 is present, but without the potential gradient between the respective injection electrode and the additional electrode because the additional electrodes are not present in the embodiment in FIG. 10. This is represented by the solid lines in FIG. 11. In accordance with the principle of field switching, the potential gradient A is present in the common ionization chamber 13, 23, as a result of which potential gradient the ionization chamber 13, 23 is substantially free of electric fields. A drift field with the potential gradient D is present in the first drift chamber 14 and in the second drift chamber 24. If, after a sufficient quantity of ions have accumulated in the ionization chamber 13, 23, the switching of the field switching ion gate is then carried out, such that the ions are transferred into the respective drift chambers 14, 24 (ion injection period), this is effected by switching the potentials at the injection electrodes 12, 22, as is represented by the dotted lines in FIG. 11. A comparatively steep potential gradient B is then present in the ionization chamber 13, 23. The potential level is altered in each case in the respective drift chambers 14, 24, wherein the potential gradient E, i.e. the respective slope of the potential over the distance s, remains the same and corresponds to the slope of the potential gradient D. This is achieved by the potentials at the respective detector 16, 26 being switched by the same magnitude as those at the respective injection electrode 12, 22.

FIG. 12 shows an alternative embodiment of the switching of the potentials in comparison with FIG. 11. During the ion generating period the same state as in accordance with FIG. 11 is present, i.e. a substantially neutral potential gradient A in the common ionization chamber 13, 23 and the respective potential gradients D in the drift chambers 14, 24. During the switching of the field switching ion gate for transferring the ions into the respective drift chambers 14, 24, the same potential switching at the injection electrodes 12, 22 as explained in accordance with FIG. 11 is effected, i.e. a potential gradient B is generated in the common ionization chamber 13, 23. In contrast to FIG. 11, however, here the potential at the detectors 16, 26 is not switched. This results in a respective potential gradient E in the drift chambers 14, 24 which is smaller in magnitude than the potential gradient D, such that the movement velocity of the ions in the respective drift chamber 14, 24 in comparison with the variant in FIG. 11 is lower initially, i.e. during the ion injection period. It is then possible to effect switching again to a higher potential gradient, e.g. the potential gradient D.

The type of switching of the potentials described above with reference to the embodiment of the ion mobility spectrometer in accordance with FIG. 10 can also be used advantageously in the embodiment of the ion mobility spectrometer in accordance with FIG. 8. In the embodiment in accordance with FIG. 8, the additional electrodes 19, 29 are present in addition to the multifunctional electrodes formed by the injection electrodes 12, 22. This is taken as a basis in the embodiment of the ion mobility spectrometer in accordance with FIG. 13, too, this spectrometer being comparable with the embodiment in FIG. 8. In this ion mobility spectrometer, the potential switching can be effected in accordance with FIG. 14. In this case, the potential profiles and also the switching between the potential gradients A and B correspond to the embodiment in FIG. 11. Likewise analogously to FIG. 11, in the respective drift chamber 14, 24 there occurs a parallel shift of the potential gradients between the ion generating period (potential gradient D) and the ion injection period (potential gradient E), i.e. the period in which the ions are transferred into the respective drift chamber 14, 24. In this case, the potential gradients D, E run parallel, which is realized by switching of the potentials at the respective detector 16, 26.

In addition, in the ion generating period in the respective space between the first injection electrode 12 and the first additional electrode 19 or between the second injection electrode 22 and the second additional electrode 29 a potential gradient is set which is largely neutral, i.e. substantially corresponds to the potential gradient A, but in this case may have a slight slope opposite to the potential gradient D in the respectively assigned drift chamber 14, 24. In this way, the punch-through of the field into the common ionization chamber 13, 23 from the respective drift chamber 14, 24 can be neutralized by the respective additional electrode 19, 29.

The switching of the potentials can also be effected in accordance with FIG. 15, the type of switching of the potentials substantially corresponding to the embodiment in FIG. 12. As in FIG. 12, in FIG. 15 the potentials at the detectors 16, 26 are not switched, which results in a potential gradient E that is smaller in magnitude than the potential gradient D.

FIG. 16 shows one embodiment of an ion mobility spectrometer with an axial arrangement of the drift chambers 14, 24, wherein, in addition to the multifunctional electrodes, i.e. the first and second injection electrodes 12, 22, and the first and second additional electrodes 19, 29, respective first and second further additional electrodes 31, 32 are present, which are disposed upstream of the respective additional electrode 19, 29 in the direction of the respective drift chamber 14, 24. FIG. 17 shows advantageous potential profiles for an ion mobility spectrometer in accordance with FIG. 16. Once again the potential profile during the ion generating period is represented by the solid lines, and the potential profile during the ion injection period by the dotted lines. In this way, extended field switching can advantageously be realized without the need to alter the potential or the potential profile D in the respective drift chamber 14, 24. In this case, the transition of the potential gradient between the ion gate and the respective drift chamber can be regulated by the first and second further additional electrodes 31, 32.

FIG. 18 shows an ion mobility spectrometer with a parallel arrangement of the drift chambers 14, 24, which spectrometer substantially corresponds to the embodiment in FIG. 2. FIGS. 19 to 22 illustrate advantageous potential profiles during the ion generating period and the ion injection period. In this case, the upper half of the respective diagram illustrates the potential profile in the upper half of the ion mobility spectrometer, and the lower half of the diagram illustrates the potential profile in the lower half of the ion mobility spectrometer. For further differentiation, here the potential profile in the upper half of the ion mobility spectrometer is represented by a solid line, and the potential profile in the lower half by a dotted line. This assignment also applies to FIGS. 24 to 27 and 29 to 32.

Figures 19, 20:
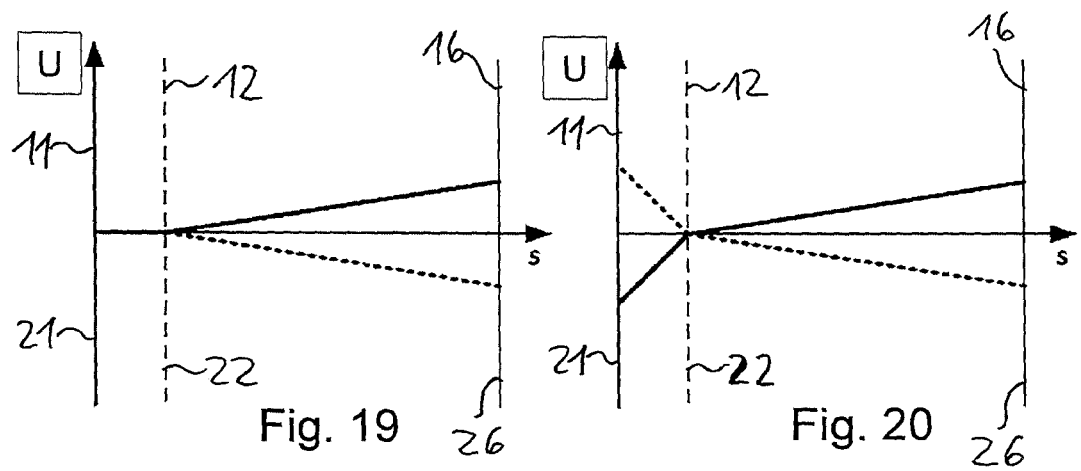

FIG. 19 shows a potential profile during the ion generating period, and FIG. 20 shows an associated potential profile during the ion injection period. It is assumed here that both field switching ion gates use a common injection electrode 12, 22, or that these injection electrodes 12, 22 are at the same potential. A common counter electrode 11, 21 would also be possible. In this case, FIGS. 19 and 20 show advantageous switching cycles during normal field switching operation of the ion gates 10, 20. In this case, potential switching is carried out only at the respective counter electrode 11, 21.

Figures 21, 22:
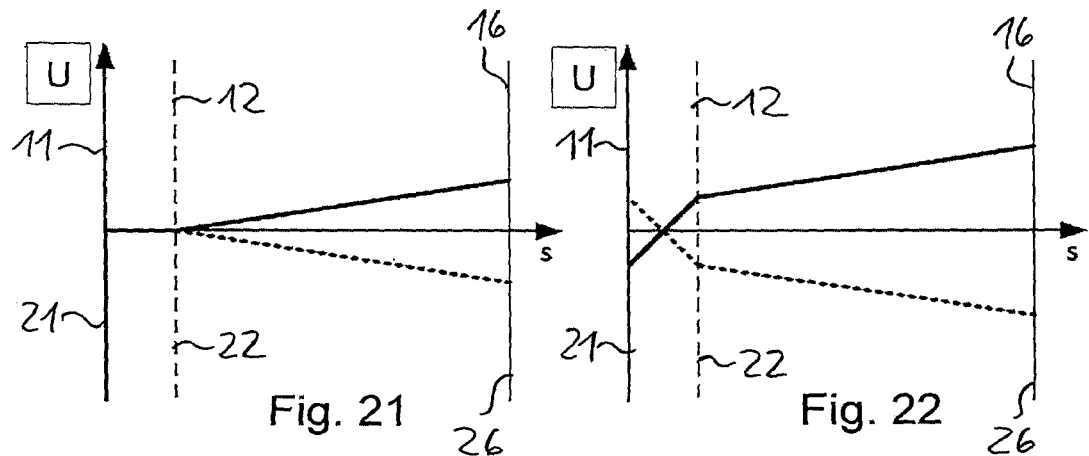

In contrast thereto, FIGS. 21 and 22 show potential profiles in which potential switching is carried out both at the injection electrodes 12, 22 and at the counter electrodes 11, 21, which in FIG. 22 leads to the intersecting profile of the potentials in the ionization chambers 13, 23. In this case, FIG. 21 once again shows the potential profile during the ion generating period, and FIG. 22 that during the ion injection period.

The embodiment in accordance with FIGS. 21 and 22 has the advantage that the same field strength prevails between a respective pair of counter electrode and injection electrode, but the potential difference between the counter electrodes 11, 21 is smaller. Breakdowns, for example, can be prevented as a result. Moreover, the driving is simplified since some potentials can be used multiply. As is evident, the embodiment in accordance with FIGS. 21 and 22, which substantially corresponds to the methods from FIGS. 11, 12, requires potential switching at the respective detectors 16, 26 if ultimately the same potential gradient is to be attained in the drift chamber 14, 24. Alternatively, the potential at the respective detector can be kept constant, which leads to a reduced potential gradient in the respective drift chamber 14, 24.

FIG. 23 shows an ion mobility spectrometer which largely corresponds to the embodiment in FIG. 18. In contrast to FIG. 18, in the embodiment in FIG. 23, a respective first and second additional electrode 19, 29 is disposed upstream of the respective drift chamber 14, 24. Accordingly, in the embodiment in FIG. 23, extended field switching can advantageously be carried out in both ion gates.

Figures 24, 25:
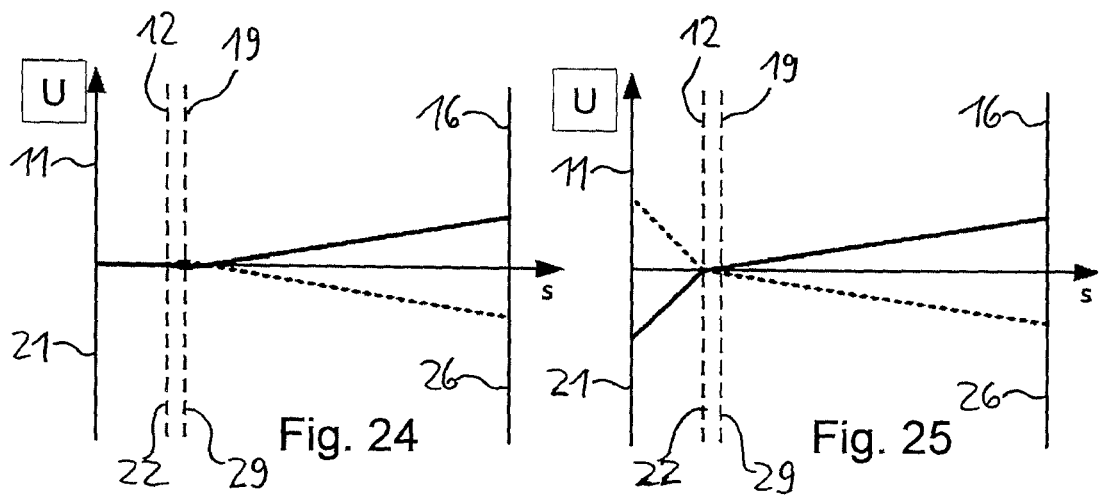

FIGS. 24 and 25 show possible potential profiles for the embodiment in FIG. 23, wherein the potential profiles in accordance with FIGS. 24 and 25 largely correspond to the embodiment in FIGS. 19 and 29. In the space between the respective injection electrode and the additional electrode, in this case, a shielding field with a corresponding opposite gradient to the field in the respective drift chamber is generated in order to neutralize the punch-through of the field from the drift chamber into the ionization chamber. In this case, FIG. 24 shows the potential profile during the ion generating period, and FIG. 25 shows the potential profile during the ion injection period.

Figures 26, 27:
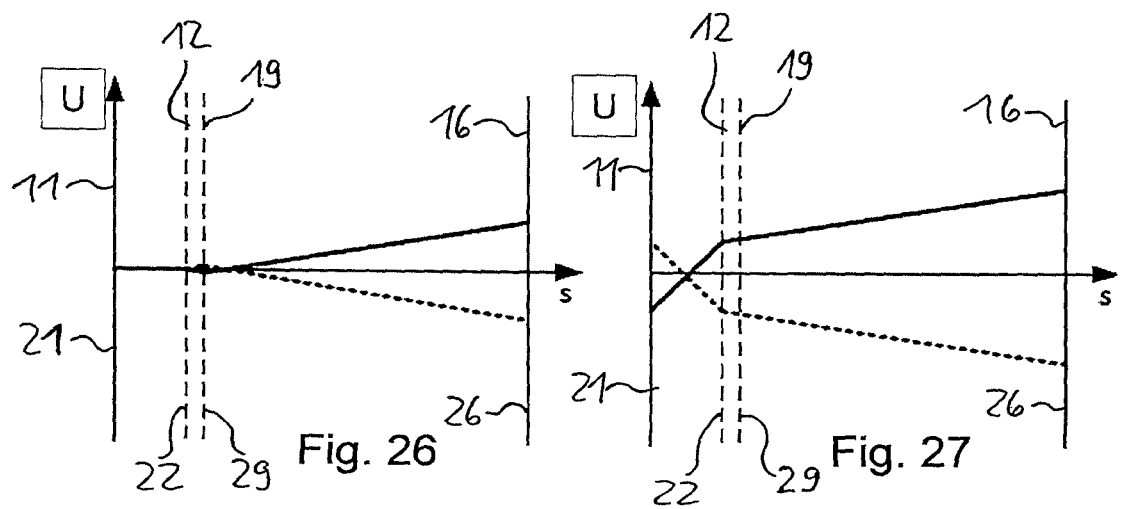

FIGS. 26 and 27 show potential profiles comparable to FIGS. 21 and 22. In contrast to FIGS. 21 and 22, in FIGS. 26 and 27 the corresponding fields between the injection electrode and the additional electrode for neutralizing the field punch-through are again generated. In this case, FIG. 26 shows the potential profile during the ion generating period, and FIG. 27 that during the ion injection period.

FIG. 28 shows one embodiment of an ion mobility spectrometer which largely corresponds to the embodiment in FIG. 23. In contrast to FIG. 23, the already mentioned further first additional electrode 31 and the further second additional electrode 32 are also present in the embodiment in FIG. 28. In this case, the further first additional electrode 31 is disposed upstream of the first additional electrode 19 in the direction of the drift chamber 14, and the further second additional electrode 32 is disposed upstream of the second additional electrode 29 in the direction of the second drift chamber 24.

This configuration of the electrodes makes it possible, in the embodiment in FIG. 28, to realize both extended field switching and double field switching, i.e. the compression of the ion packets in the second compression step.

FIGS. 29 and 30 show advantageous potential profiles for an ion mobility spectrometer in accordance with FIG. 28, which are embodied analogously to the switching logic in FIGS. 19 and 20. FIG. 29 shows the potential profiles during the ion generating period, and FIG. 30 those during the ion injection period.

FIGS. 31 and 32 show potential profiles that are analogous to the embodiment in FIGS. 21 and 22. It is evident that in particular during the ion generating period a relatively steep potential gradient is generated in the space between the respective additional electrode and the further additional electrode. FIG. 31 shows the potential profiles during the ion generating period, and FIG. 32 those during the ion injection period.

On the basis of the steep potential gradient, FIGS. 29 and 31 thus also show possible potential profiles for the second compression step during double field switching.

LIST OF REFERENCE SIGNS 1, 2 Ion mobility spectrometer (first IMS tube, second IMS tube)
3 Ionization source
10 First ion gate
11 First counter electrode
12 First injection electrode
13 First ionization chamber
14 First drift chamber
15 First field generating device 16 First ion detector
17 First drift gas inlet connection
18 First drift gas outlet connection
19 First additional electrode
20 Second ion gate
21 Second counter electrode
22 Second injection electrode
23 Second ionization chamber
24 Second drift chamber
25 Second field generating device
26 Second ion detector
27 Second drift gas inlet connection
28 Second drift gas outlet connection
29 Second additional electrode
31 Further first additional electrode
32 Further second additional electrode
A Solid line
B Dashed line
C Dotted line
D Potential gradient
U Electrical potential
s Longitudinal extent

The invention claimed is:

1. An ion mobility spectrometer, comprising:
at least a first drift chamber,
a first ionization chamber,
a first switchable ion gate for controlled transfer of ions from the first ionization chamber into the at least the first drift chamber,
a second drift chamber separated from the first drift chamber,
a second ionization chamber, and
a second switchable ion gate for controlled transfer of ions from the second ionization chamber into the second drift chamber,
wherein the first and second ionization chambers are a common ionization chamber or separate chambers,
wherein by an ionization source ions to be analyzed are generated from a sample and are provided in the first and/or the second ionization chamber or the common ionization chamber,
a) wherein
the first switchable ion gate is configured as a field switching ion gate having a first counter electrode and a first injection electrode,
the first ionization chamber or the common ionization chamber extends from the first counter electrode to the first injection electrode,
the ion mobility spectrometer being configured to provide the ions to be analyzed during an ion generation period in the first ionization chamber or the common ionization chamber, wherein during the ion generation period an entirety of the first ionization chamber or the common ionization chamber is in a substantially field-free state, wherein during the ion generation period all of the provided ions are not moved in any direction due to electric fields,
at least one of the first counter electrode and the first injection electrode being switchable in an analysis step so that ions are set in motion in a direction of the at least a first drift chamber;
and/or
b) wherein
the second switchable ion gate is configured as a field switching ion gate having a second counter electrode and a second injection electrode,
the second ionization chamber or the common ionization chamber extends from the second counter electrode to the second injection electrode,
the ion mobility spectrometer being configured to provide the ions to be analyzed during the ion generation period in the second ionization chamber or the common ionization chamber, wherein during the ion generation period an entirety of the second ionization chamber or the common ionization chamber is in a substantially field-free state, wherein during the ion generation period all of the provided ions are not moved in any direction due to electric fields,
at least one of the second counter electrode and the second injection electrode being switchable in the analysis step so that ions are set in motion in a direction of the second drift chamber.

2. The ion mobility spectrometer as claimed in claim 1, wherein the first ionization chamber is formed between the first counter electrode and the first injection electrode,
wherein the ions to be analyzed are fed from the ionization source into the first ionization chamber.

3. The ion mobility spectrometer as claimed in claim 1, wherein the second ionization chamber is formed between the second counter electrode and the second injection electrode,
wherein the ions to be analyzed are fed from the ionization source into the second ionization chamber.

4. The ion mobility spectrometer as claimed in claim 1, wherein the first and second counter electrodes are short-circuited with one another or are embodied as a common counter electrode or the first and second injection electrodes are short-circuited with one another or are embodied as a common injection electrode.

5. The ion mobility spectrometer as claimed in claim 1 wherein
at least one first additional electrode is arranged between the first switchable ion gate and the first drift chamber, and ions to be transferred into the first drift chamber by the first switchable ion gate are influenceable by said first additional electrode,
and/or
at least one second additional electrode is arranged between the second switchable ion gate and the second drift chamber, and ions to be transferred into the second drift chamber by the second switchable ion gate are influenceable by said second additional electrode.

6. The ion mobility spectrometer as claimed in claim 5, wherein the first additional electrode and/or the second additional electrode are/is embodied in potential-switchable fashion.

7. The ion mobility spectrometer as claimed in claim 5, wherein the first additional electrode and/or the second additional electrode are/is embodied in non-potential-switchable fashion.

8. The ion mobility spectrometer as claimed in claim 1, wherein the first and second ion gates are formed from an arrangement of at least a first and a second multifunctional electrode, wherein the first multifunctional electrode is disposed upstream of the first drift chamber and the second multifunctional electrode is disposed upstream of the second drift chamber, wherein the first multifunctional electrode forms an injection electrode of the first switchable ion gate and the second multifunctional electrode forms a counter electrode of the first switchable ion gate, and the second multifunctional electrode forms an injection electrode of the second ion gate and the first multifunctional electrode forms a counter electrode of the second switchable ion gate.

9. The ion mobility spectrometer as claimed in claim 1 wherein the first and second drift chambers are arranged substantially parallel next to one another.

10. The ion mobility spectrometer as claimed in claim 1 wherein the ion mobility spectrometer comprises no additional field generating device for generating an electric field in the first and/or second ionization chamber, such that an electric field is generated in the first ionization chamber only by electrodes of the first switchable ion gate and/or an electric field is generated in the second ionization chamber only by electrodes of the second switchable ion gate.

11. The ion mobility spectrometer as claimed in claim 1, further comprising as the ionization source an X-ray ionization source, a UV ionization source, a corona ionization source, a plasma ionization source, a dielectric barrier discharge source and/or an electron emitter.

12. A method for analyzing samples by ion mobility spectrometry using an ion mobility spectrometer as claimed in claim 1, comprising
- generating by the ionization source one or more positive ions and negative ions to be analyzed from a sample,
- providing the one or more positive and negative ions generated in at least one of the first ionization chamber, the second ionization chamber, or the common ionization chamber,
- guiding, under the control of one or more of the first ion gate and the second ion gate, the one or more positive and negative ions through one or more of the first and second drift chambers to separate first and second ion detectors, a)
- generating the one or more positive ions and negative ions to be analyzed during the ion generation period in the first ionization chamber or the common ionization chamber, wherein during the ion generation period the entirety of the first ionization chamber or the common ionization chamber is in the substantially field-free state, wherein during the ion generation period all of the one or more of positive ions and negative ions are not moved in any direction due to electric fields, and
- switching at least one of the first counter electrode and the first injection electrode to set the one or more of positive ions and negative ions in motion towards the first ionization drift chamber, and
- analyzing the one or more of positive and negative ions with the first ion detector, and/or b)
- generating the one or more positive ions and negative ions to be analyzed during the ion generation period in the second ionization chamber or the common ionization chamber, wherein during the ion generation period an entirety of the second ionization chamber or the common ionization chamber is in the substantially field-free state, wherein during the ion generation period all of the one or more of positive ions and negative ions are not moved in any direction due to electric fields, and
- switching at least one of the second counter electrode and the second injection electrode to set the one or more of positive ions and negative ions in motion towards the second ionization drift chamber, and
- analyzing the one or more of positive and negative ions with the second ion detector.

13. The method as claimed in claim 12 wherein the first and second counter electrodes have a same potential.

* * * * *